United States Patent
Iwazaki et al.

(10) Patent No.: US 11,155,162 B2
(45) Date of Patent: Oct. 26, 2021

(54) TRAVEL CONTROL APPARATUS

(71) Applicant: Toyota Jidosha Kabushiki Kaisha, Toyota (JP)

(72) Inventors: Noritsugu Iwazaki, Shizuoka-ken (JP); Yusuke Suetake, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 16/678,168

(22) Filed: Nov. 8, 2019

(65) Prior Publication Data

US 2020/0148057 A1 May 14, 2020

(30) Foreign Application Priority Data

Nov. 13, 2018 (JP) .............................. JP2018-213200

(51) Int. Cl.
*B60T 8/00* (2006.01)
*B60K 17/346* (2006.01)

(52) U.S. Cl.
CPC .............. *B60K 17/346* (2013.01); *B60T 8/00* (2013.01)

(58) Field of Classification Search
CPC ............ B60K 17/346; B60K 2023/043; B60K 2023/0833; B60K 2023/0858; B60K 23/04; B60K 23/08; B60K 23/0808; B60K 17/35; B60T 8/00; B60Y 2400/424; B60W 10/16; B60W 30/02; B60W 10/18; B60W 30/045; B60W 2520/105; B60W 2520/125

See application file for complete search history.

(56) References Cited

U.S. PATENT DOCUMENTS

| 9,376,101 | B2* | 6/2016 | Goodrich | B60W 10/14 |
| 9,598,068 | B2* | 3/2017 | Maeda | B60K 23/08 |
| 2006/0162981 | A1* | 7/2006 | Kurosawa | B60T 8/1755 |
| | | | | 180/249 |
| 2007/0029127 | A1 | 2/2007 | Mori et al. | |
| 2012/0065850 | A1 | 3/2012 | Matsuno | |

FOREIGN PATENT DOCUMENTS

| JP | 2007-045194 A | 2/2007 |
| JP | 2012-056511 A | 3/2012 |
| JP | 2013-49292 A | 3/2013 |
| JP | 2013-256253 A | 12/2013 |

* cited by examiner

Primary Examiner — Justin Holmes
(74) Attorney, Agent, or Firm — Dinsmore & Shohl LLP

(57) ABSTRACT

Disclosed is a travel control apparatus applied to a vehicle which includes two coupling apparatuses individually changing coupling torques between a drive output part for secondary drive wheels and left and right secondary drive wheel axles and in which the ratio of rotational speed of the drive output part to the average of rotational speeds of primary drive wheels is greater than 1. The apparatus generates a yaw moment in a turning direction by using driving force. When a demand of further increasing the yaw moment arises, the control apparatus renders the braking force of the primary drive wheel on the turning locus inner side coincident with a target braking force changing with the travel state of the vehicle and decreases the coupling torque of the coupling apparatus corresponding to the secondary drive wheel on the turning locus outer side. As a result, generation of an anti-spin moment is avoided.

6 Claims, 15 Drawing Sheets

TRAVEL CONTROL APPARATUS

CROSS-REFERENCE TO RELATED APPLICATION

This application claims priority to Japanese Patent Application No. 2018-213200 filed on Nov. 13, 2018, the entire contents of which are hereby incorporated by reference.

BACKGROUND

1. Technical Field

The present disclosure relates to a travel control apparatus applied to a four-wheel drive vehicle which includes a differential apparatus for transmitting driving force generated by a drive apparatus to left and right primary drive wheels, and a final gear apparatus for transmitting the driving force to left and right secondary drive wheels.

2. Description of the Related Art

A conventionally known four-wheel drive vehicle includes a first coupling apparatus disposed between a left secondary drive wheel axle and a drive output part of a final gear apparatus, and a second coupling apparatus disposed between a right secondary drive wheel axle and the drive output part. The secondary drive wheels are wheels to which driving force is or is not transmitted in accordance with the engagement states of the coupling apparatuses. In contrast, the primary drive wheels are wheels to which driving force is transmitted at all times.

In one four-wheel drive vehicle (hereinafter also simply referred to as the "vehicle") of such a type, for example, front wheels are used as primary drive wheels, and rear wheels are used as secondary drive wheels. Further, in such a vehicle, the gear ratio (hereinafter also referred to as the "speed increasing ratio") of a power transmission mechanism may be set such that the rotational speed of the drive output part of the final gear apparatus for rear wheels becomes higher than the average of the rotational speeds of the front left and front right wheel axles.

When the vehicle turns, one type of a travel control apparatus mounted on such a vehicle (hereinafter referred to as the "conventional apparatus") performs coupling torque control. In the coupling torque control, the travel control apparatus transmits the driving force only to a rear wheel on the outer side of a turning locus (hereinafter referred to as the "turning locus outer side") by controlling the first and second coupling apparatuses. In this case, because of the above-mentioned speed increasing ratio, the rotational speed of the drive output part of the final gear apparatus for the rear wheels becomes higher than the rotational speed of the rear wheel on the turning locus outer side. As a result, a driving force is generated at the rear wheel on the turning locus outer side.

Therefore, the conventional apparatus can generate a yaw moment in the turning direction in the vehicle, thereby enhancing the turning performance of the vehicle (see, for example, Japanese Patent Application Laid-Open (kokai) No. 2007-45194 (FIG. 1)). Hereinafter, such control will also be referred to as "yaw moment control by driving force."

Incidentally, in the case where the magnitude of the yaw moment in the turning direction produced only by the "yaw moment control by driving force" is insufficient, "yaw moment control by braking force" which applies a braking force to a front wheel on the inner side of the turning locus (hereinafter referred to as the "turning locus inner side") may be performed.

However, since the application of the braking force to the front wheel on the turning locus inner side results in a decrease in the rotational speed of the front wheel on the turning locus inner side, the average of the rotational speed of the front wheel on the turning locus outer side and the rotational speed of the front wheel on the turning locus inner side (i.e., the rotational speed of the differential apparatus) decreases. Therefore, the rotational speed of the drive output part also decreases. At that time, if the rotational speed of the drive output part becomes lower than the rotational speed of the rear wheel on the turning locus outer side, substantial braking force is generated at the rear wheel on the turning locus outer side. As a result, the rear wheel on the turning locus outer side generates an anti-spin moment (yaw moment in a direction opposite the turning direction), and consequently, the turning performance may deteriorate.

SUMMARY

The present disclosure has been made to solve the above-mentioned problem. Specifically, one object of the present disclosure is to provide a travel control apparatus which can prevent occurrence of a situation in which one of secondary drive wheels generates an anti-spin moment when execution of yaw moment control by braking force is started during execution of yaw moment control by driving force.

A travel control apparatus according to the present disclosure (hereinafter also referred to as "present disclosure apparatus") is applied to a four-wheel drive vehicle (10).

The four-wheel drive vehicle includes a drive apparatus (20), a differential apparatus (31), a transfer gear apparatus (33), a final gear apparatus (35), a first coupling apparatus (361), a second coupling apparatus (362), and a brake apparatus (40).

The drive apparatus is configured to be capable of generating driving force. The differential apparatus is configured to transmit the driving force to a left primary drive wheel axle (32L) connected to a left primary drive wheel (WFL) and a right primary drive wheel axle (32R) connected to a right primary drive wheel (WFR) and allow a differential between the left primary drive wheel axle and the right primary drive wheel axle. The transfer gear apparatus is configured to transmit the driving force to a secondary drive wheel side. The final gear apparatus is configured to be capable of transmitting the driving force from the transfer gear apparatus to a left secondary drive wheel axle (38L) connected to a left secondary drive wheel (WRL) and a right secondary drive wheel axle (38R) connected to a right secondary drive wheel (WRR).

The first coupling apparatus is interposed between a drive output part (353) of the final gear apparatus and the left secondary drive wheel axle and is configured to be capable of changing coupling torque (Tc1) between the drive output part and the left secondary drive wheel axle. The second coupling apparatus is interposed between the drive output part and the right secondary drive wheel axle and is configured to be capable of changing coupling torque (Tc2) between the drive output part and the right secondary drive wheel axle.

The brake apparatus is configured to be capable of individually changing braking forces applied to the left primary drive wheel, the right primary drive wheel, the left secondary drive wheels, and the right secondary drive wheel, respectively.

Further, in the four-wheel drive vehicle, a ratio (speed increasing ratio RZ) of "rotational speed (Nr) of the drive output part" to the "average (Nf) of rotational speed (Nfl) of the left primary drive wheel axle and rotational speed (Nfr) of the right primary drive wheel axle" is set to a predetermined ratio greater than 1.

The present disclosure apparatus comprises a controller (60) configured to be capable of controlling the coupling torque of the first coupling apparatus and the coupling torque of the second coupling apparatus independently of each other and to be capable of individually controlling the braking forces of the wheels by using the brake apparatus.

When the four-wheel drive vehicle is turning, in order to increase a yaw moment of the four-wheel drive vehicle in a turning direction, the controller executes "driving force yaw moment control" of setting the coupling torque of one of the first coupling apparatus and the second coupling apparatus which corresponds to the secondary drive wheel on the turning locus outer side to a value greater than zero and setting the coupling torque of the other coupling apparatus to zero.

Incidentally, as described above, when a braking force is applied to the front wheel (primary drive wheel) on the turning locus inner side in a state in which the driving force yaw moment control is being executed, the rotational speed of the front wheel (primary drive wheel) on the turning locus inner side decreases. As a result, the rotational speed of the differential apparatus and the rotational speed of the drive output part also decrease. Meanwhile, the rear wheel on the turning locus outer side maintains a rotational speed approximately equal to the rotational speed of the front wheel on the turning locus outer side. Therefore, in some cases, the rotational speed of the drive output part becomes lower than the rotational speed of the rear wheel (secondary drive wheel) on the turning locus outer side. In this case, driving torque is transmitted from the rear wheel on the turning locus outer side to the drive output part. As a result, a substantial braking force is generated at the rear wheel on the turning locus outer side, whereby an anti-spin moment may be generated.

In view of the forgoing, the controller is configured such that, when a demand of further increasing the yaw moment in the turning direction arises during execution of the driving force yaw moment control (Step 525: No, Step 1340: Yes), the controller executes one of the following first and second controls.

The first control renders the braking force (Fbfin) of the primary drive wheel on the turning locus inner side coincident with a first target braking force (Fbtfin) changing with a travel state of the four-wheel drive vehicle, and decreases the coupling torque of one of the first coupling apparatus and the second coupling apparatus which corresponds to the secondary drive wheel on the turning locus outer side (Step 535).

The second control renders the braking force (Fbrin) of the secondary drive wheel on the turning locus inner side coincident with a second target braking force (Fbtrin) changing with the travel state of the four-wheel drive vehicle (Step 1360).

As described above, the present disclosure apparatus can avoid a situation in which one of the secondary drive wheel generates an anti-spin moment when the "braking force yaw moment control" is executed in the case where the vehicle is turning while traveling in a state in which the coupling torque of one of the first coupling apparatus and the second coupling apparatus on the turning locus outer side is rendered large (namely, the driving force yaw moment control is being executed).

In one aspect of the present disclosure apparatus, the controller is configured to execute the first control, and the controller is configured to execute, as the first control, control of rendering the driving force (Fdrout) of the secondary drive wheel on the turning locus outer side coincident with a value obtained by subtracting the "magnitude (|Fbtfin|) of the first target braking force" from the "magnitude (|Fdroutp|) of the driving force of the secondary drive wheel on the turning locus outer side at the time (|Gy|=Gyth) of arising of the demand of further increasing the yaw moment in the turning direction" (Step 535).

According to the aspect, the yaw moment in the turning direction is switched smoothly, without interruption, from the yaw moment in the turning direction produced by the driving force generated by the secondary drive wheel on the turning locus outer side to the yaw moment in the turning direction produced by the braking force generated by the primary drive wheel on the turning locus inner side. Accordingly, the apparatus according to the aspect can execute the "first control" without giving an uncomfortable feeling to occupants of the four-wheel drive vehicle, including a driver.

In one aspect of the present disclosure apparatus, the controller is configured such that, in the case where, during execution of the first control, the magnitude (|Gy|) of lateral acceleration of the four-wheel drive vehicle changes from a first magnitude to a second magnitude, the first magnitude being equal to or larger than a determination value (Gyth−A) which is smaller by a predetermined value (A) than the magnitude (Gyth) of lateral acceleration at the time of arising of the demand of further increasing the yaw moment in the turning direction and the second magnitude being smaller than the determination value (Step 545: No), the controller increases the coupling torque of one of the first coupling apparatus and the second coupling apparatus which corresponds to the secondary drive wheel on the turning locus outer side such that the driving force of the secondary drive wheel on the turning locus outer side coincides with a target driving force determined based on the travel state of the four-wheel drive vehicle (Step 565, Step 570, Step 575).

According to the aspect, a hysteresis characteristic can be imparted to a change in the "driving force of the secondary drive wheel on the turning locus outer side" with the magnitude of a parameter (for example, lateral acceleration) representing the travel state of the vehicle. Namely, a threshold for applying braking force to the primary drive wheel on the turning locus inner side (in other words, a threshold for starting reduction of the driving force of the secondary drive wheel on the turning locus outer side) in the case where the magnitude of the parameter representing the travel state is increasing differs from a threshold for applying driving force to the secondary drive wheel on the turning locus outer side in the case where the magnitude of the parameter representing the travel state is decreasing. Accordingly, the present disclosure apparatus can avoid a situation in which generation of the driving force of one of the secondary drive wheels frequently starts and stops even when the magnitude of the parameter representing the travel state increases and decreases frequently while the vehicle is turning. As a result, the present disclosure apparatus can stably execute the yaw moment control.

In one aspect of the present disclosure apparatus, the controller is configured to decrease the coupling torque of one of the first coupling apparatus and the second coupling apparatus which corresponds to the secondary drive wheel on the turning locus outer side (Step 555) when the direction of change of the magnitude of the lateral acceleration changes from an increasing direction (d|Gy|/dt≥0) to a decreasing direction (d|Gy|/dt<0) (Step 520: No, Step 545: Yes, Step 550: Yes).

According to the aspect, when the magnitude of lateral acceleration of the vehicle is decreasing, the driving force of the secondary drive wheel on the turning locus outer side is caused to reach zero or a value near zero before the magnitude of lateral acceleration reaches a "value smaller than a predetermined threshold by a predetermined amount." As a result, when the magnitude of the parameter representing the travel state becomes smaller than the "value smaller than the predetermined threshold by the predetermined amount," the driving force of the secondary drive wheel on the turning locus outer side can be increased from zero or the value near zero. In other words, according to the aspect, even in the case where, after the increasing magnitude of lateral acceleration has exceeded the "predetermined threshold" and the driving force of the secondary drive wheel on the turning locus outer side has started to decrease, the direction of change of the magnitude of lateral acceleration changes to the decreasing direction before the driving force of the secondary drive wheel on the turning locus outer side reaches zero, the driving force of the secondary drive wheel on the turning locus outer side can be decreased continuously. As a result, when the magnitude of lateral acceleration becomes equal to the "value smaller than the predetermined threshold by the predetermined amount," the driving force of the secondary drive wheel on the turning locus outer side can reach zero or a value near zero. Accordingly, according to the aspect, when the decreasing magnitude of lateral acceleration becomes equal to the "value smaller than the predetermined threshold by the predetermined amount," the driving force of the secondary drive wheel on the turning locus outer side can be always increased from zero or the value near zero to the target driving force. As a result, in the case where the magnitude of lateral acceleration is decreasing, the yaw moment control by driving force is executed stably.

In the above description, in order to facilitate understanding of the present disclosure, the constituent elements of the disclosure corresponding to those of embodiments of the disclosure which will be described later are accompanied by parenthesized names and/or symbols which are used in the embodiments; however, the constituent elements of the disclosure are not limited to those in the embodiments defined by the names and/or the symbols. Other objects, other features, and attendant advantages of the present disclosure will be readily appreciated from the following description of the embodiments of the disclosure which is made with reference to the accompanying drawings.

BRIEF DESCRIPTION OF THE DRAWINGS

FIG. 3A is a diagram for describing driving force yaw moment control executed by the travel control apparatus illustrated in FIG. 1, wherein FIG. 3A shows a case where the vehicle is turning rightward.

FIG. 3B is a diagram for describing driving force yaw moment control executed by the travel control apparatus shown in FIG. 1, wherein FIG. 3B shows a case where the vehicle is turning leftward.

FIG. 4A is a diagram for describing the rotational speeds of the wheels, a front differential case, and a rear differential case when the driving force yaw moment control and/or braking force yaw moment control is being executed during the rightward turning of the vehicle shown in FIG. 1, wherein FIG. 4A shows a case where only the driving force yaw moment control is executed.

FIG. 4B is a diagram for describing the rotational speeds of the wheels, a front differential case, and a rear differential case when the driving force yaw moment control and/or braking force yaw moment control is being executed during the rightward turning of the vehicle shown in FIG. 1, wherein FIG. 4B shows a case where a braking force is applied to the front right wheel as the braking force yaw moment control.

DETAILED DESCRIPTION

First Embodiment (Configuration)

Figure 1:
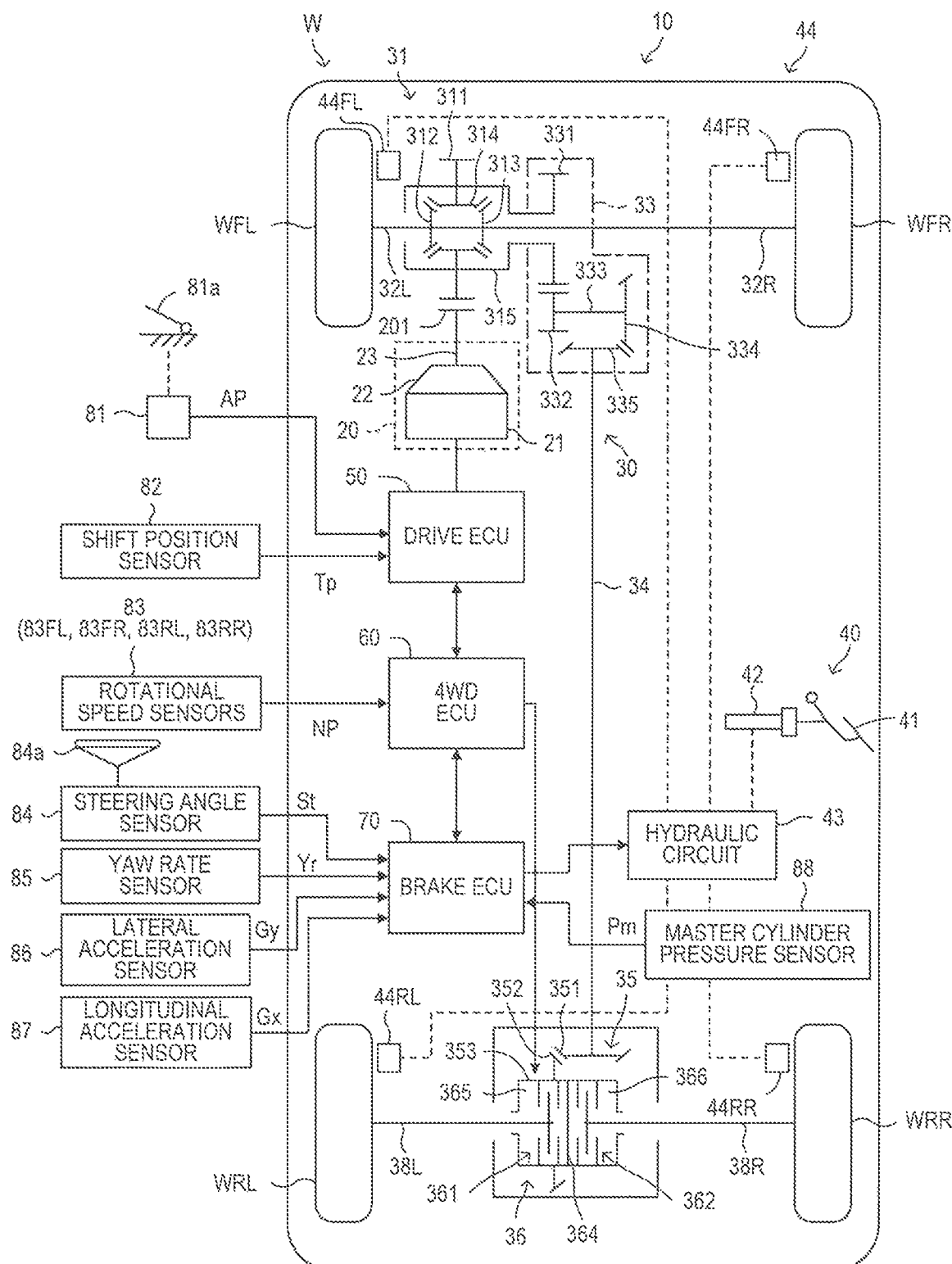
FIG. 1 is a schematic diagram of a travel control apparatus according to a first embodiment of the present disclosure.

A travel control apparatus according to a first embodiment of the present disclosure (hereinafter also referred to as the "first apparatus") is applied to a four-wheel drive vehicle (vehicle) 10 as shown in FIG. 1.

The vehicle 10 includes a drive apparatus 20, a power transmission apparatus 30, a brake apparatus 40, a drive ECU 50, a 4WD ECU 60, and a brake ECU 70.

The drive apparatus 20 includes an engine main body 21, a primary transmission 22, and an output shaft 23. The engine main body 21 is a spark-ignition-type multi-cylinder internal combustion engine. The drive apparatus 20 generates driving force for driving wheels W (a front left wheel WFL, a front right wheel WFR, a rear left wheel WRL, and a rear right wheel WRR) of the vehicle 10. The primary transmission 22 is an automatic transmission which changes the gear (gear ratio) in accordance with the travel state of the vehicle 10. The driving force generated by the engine main body 21 and output from the primary transmission 22 is transmitted to the power transmission apparatus 30 through the output shaft 23. The driving force generated by the drive apparatus 20 is transmitted to the wheels W of the vehicle 10 through the power transmission apparatus 30.

The power transmission apparatus 30 includes a differential apparatus for front wheels 31, a front left wheel axle 32L, a front right wheel axle 32R, a transfer gear apparatus 33, a propeller shaft 34, a final gear apparatus for rear wheels 35, a clutch apparatus 36, a rear left wheel axle 38L, and a rear right wheel axle 38R.

The differential apparatus for front wheels 31 includes a drive gear 311, a left side gear 312, a right side gear 313, a pinion gear 314, and a front differential case 315. The drive gear 311 is in meshing engagement with a transmission output gear 201 which outputs the driving force generated by the drive apparatus 20. The left side gear 312 is connected directly to a front left wheel axle 32L to which the front left wheel WFL is connected and rotates integrally with the front left wheel axle 32L. The right side gear 313 is connected directly to a front right wheel axle 32R to which the front right wheel WFR is connected and rotates integrally with the front right wheel axle 32R. The pinion gear 314 is in meshing engagement with the left side gear 312 and the right side gear 313. The front differential case 315 is connected directly to the drive gear 311 for integral rotation therewith and accommodates the left side gear 312, the right side gear 313, and the pinion gear 314. The differential apparatus for front wheels 31 having the above-mentioned configuration distributes the driving force generated by the drive apparatus 20 to the front left wheel axle 32L and the front right wheel axle 32R while allowing the front left wheel axle 32L and the front right wheel axle 32R to rotate at different rotational speeds. Accordingly, the driving force from the drive apparatus 20 is always transmitted to the front left wheel WFL and the front right wheel WFR. The front left wheel WFL and the front right wheel WFR to which the driving force is always transmitted will also be referred to as the left primary drive wheel WFL and the right primary drive wheel WFR, respectively. Further, the front left wheel axle 32L and the front right wheel axle 32R will also be referred to as the left primary drive wheel axle 32L and the right primary drive wheel axle 32R, respectively.

The transfer gear apparatus 33 includes an input gear 331, a counter gear 332, a counter shaft 333, a first ring gear 334, and a first pinion gear 335. The input gear 331 is connected directly to the front differential case 315 and rotates integrally with the front differential case 315. The counter gear 332 is in meshing engagement with the input gear 331. The counter gear 332 is fixed to one end of the counter shaft 333, and the first ring gear 334 is fixed to the other end of the counter shaft 333. Accordingly, the first ring gear 334 rotates integrally with the counter gear 332. The first pinion gear 335 is in meshing engagement with the first ring gear 334 and is fixed to a front end portion of the propeller shaft 34. Therefore, the propeller shaft 34 rotates Integrally with the first pinion gear 335.

The final gear apparatus for rear wheels 35 includes a second pinion gear 351, a second ring gear 352, and a rear differential case 353. The second pinion gear 351 is fixed to a rear end portion of the propeller shaft 34 and rotates integrally with the propeller shaft 34. The second ring gear 352 is in meshing engagement with the second pinion gear 351. The rear differential case 353 is a cylindrical casing which is disposed coaxially with the rear left wheel axle 38L to which the rear left wheel WRL is connected and the rear right wheel axle 38R to which the rear right wheel WRR is connected. The rear differential case 353 is connected directly to the second ring gear 352. Accordingly, the rear differential case 353 rotates integrally with the second ring gear 352 around the rear left wheel axle 38L and the rear right wheel axle 38R. The rear differential case 353 will also be referred to as the "drive output part" 353.

The clutch apparatus 36 includes a first clutch 361 and a second clutch 362. The first clutch 361 and the second clutch 362 will also be referred to as the "first coupling apparatus 361" and the "second coupling apparatus 362," respectively. In the case where the first clutch 361 and the second clutch 362 are described without distinguishing them from each other, each of the first clutch 361 and the second clutch 362 will simply be referred to as the "clutch."

A partition wall 364 is provided at a central portion of the rear differential case 353 in the axial direction (the lateral direction of the vehicle). A first clutch chamber 365 is formed on the vehicle left side of the partition wall 364, and a second clutch chamber 366 is formed on the vehicle right side of the partition wall 364. The first clutch 361 and the second clutch 362 are accommodated in the first clutch chamber 365 and the second clutch chamber 366, respectively. The structure of the clutch apparatus 36 is well known (see, for example, Japanese Patent Application Laid-Open (kokai) No. 2007-45194). Each of the first clutch 361 and the second clutch 362 is a clutch obtained by combining a multi-disc clutch and an electromagnetic clutch. The first clutch 361 and the second clutch 362 are independently controllable, coupling torque variable clutches whose coupling torques can be changed independently in accordance with instructions from the 4WD ECU 60.

When the coupling torque of the first clutch 361 is set to a value greater than zero, the driving force from the drive apparatus 20 is transmitted to the rear left wheel WRL. However, when the coupling torque of the first clutch 361 is set to zero, the driving force from the drive apparatus 20 is not transmitted to the rear left wheel WRL. When the coupling torque of the second clutch 362 is set to a value greater than zero, the driving force from the drive apparatus 20 is transmitted to the rear right wheel WRR. However, when the coupling torque of the second clutch 362 is set to zero, the driving force from the drive apparatus 20 is not transmitted to the rear right wheel WRR. The rear left wheel WRL and the rear right wheel WRR to which the driving force from the drive apparatus 20 is transmitted when necessary and is not transmitted when unnecessary will also be referred to as the left secondary drive wheel WRL and the right secondary drive wheel WRR, respectively. The rear left wheel axle 38L and the rear right wheel axle 38R will also be referred to as the left secondary drive wheel axle 38L and the right secondary drive wheel axle 38R. Further, the final gear apparatus for rear wheels 35 will also be referred to as the final gear apparatus for secondary drive wheels 35.

Incidentally, the power transmission apparatus 30 is configured such that the front-wheel-side final gear ratio becomes greater than the rear-wheel-side final gear ratio. Namely, the gear ratio of the power transmission apparatus 30 is set such that the rotational speed of the rear differential case 353 becomes higher than the rotational speed of the front differential case 315. When this gear ratio is defined as the ratio (speed increasing ratio) RZ of the rotational speed of the rear differential case 353 to the rotational speed of the front differential case 315, the speed increasing ratio RZ is set to a predetermined ratio greater than "1." In other words, the speed increasing ratio RZ is the ratio of the speed reduction ratio (hereinafter referred to as the "front speed reduction ratio") if of the differential apparatus for front wheels 31 to the speed reduction ratio (hereinafter referred to as the "rear speed reduction ratio") ir of the final gear apparatus for rear wheels 35 (RZ=if/ir).

Figure 2:
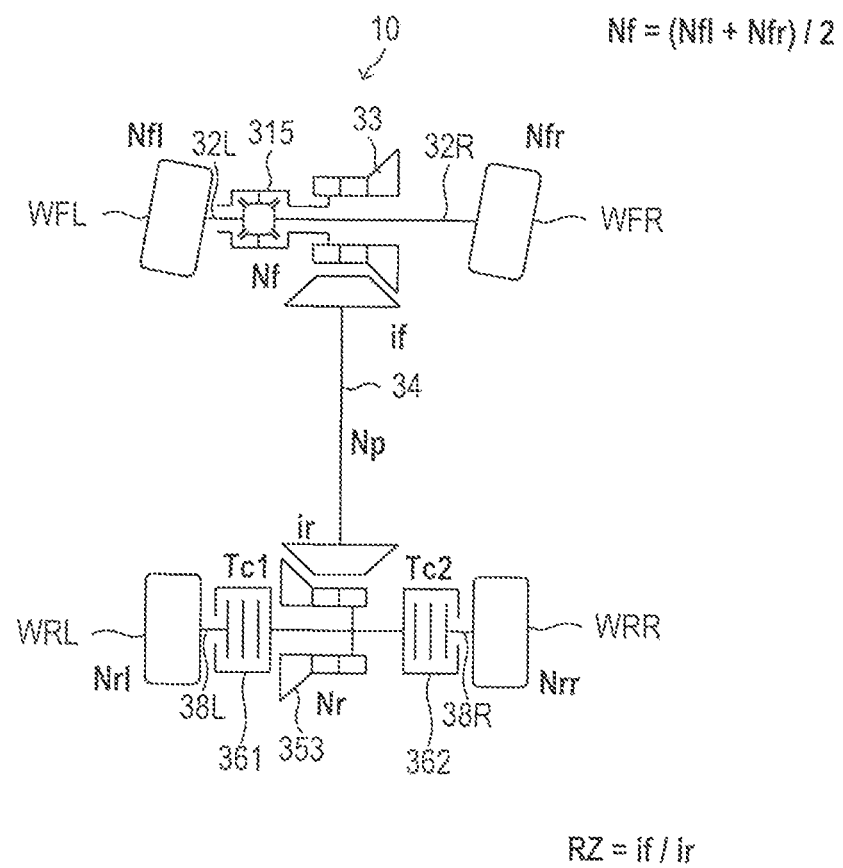
FIG. 2 is a diagram for describing the rotational speeds of various portions constituting a power transmission apparatus of the vehicle shown in FIG. 1 and the rotational speeds of wheels when the vehicle is turning rightward.

A more detailed description is provided with reference to FIG. 2. The average rotational speed Nf of the front left wheel WFL and the front right wheel WFR is calculated in accordance with the following Expression (1). In Expression (1), Nfl is the rotational speed of the front left wheel WFL, and Nfr is the rotational speed of the front right wheel WFR. Notably, the average rotational speed Nf is equal to the rotational speed of the front differential case 315.

$$Nf=(Nfl+Nfr)/2 \qquad (1)$$

The rotational speed Np of the propeller shaft 34 is calculated in accordance with the following Expression (2) as the product of the average rotational speed Nf of the front wheels and the front speed reduction ratio if.

$$Np=Nf \cdot if \qquad (2)$$

The rotational speed Nr of the rear differential case 353 of the final gear apparatus for rear wheels 35 is calculated in accordance with the following Expression (3).

$$Nr=Np/ir \qquad (3)$$

The rotational speed Nr can be represented by the following Expression (4), which is obtained by substituting Expression (2) into Expression (3).

$$Nr=Nf \cdot if/ir \qquad (4)$$

Since the front speed reduction ratio if is set to be greater than the rear speed reduction ratio ir as described above, the value of if/ir (i.e., the speed increasing ratio RZ) is greater than 1. In the present example, the speed increasing ratio RZ (=if/ir) is set to 1.02. As a result of this setting, the rotational speed Nr of the rear differential case 353 becomes 2% higher than the average rotational speed of the front wheels (i.e., the rotational speed of the front differential case 315) Nf.

Referring to FIG. 1 again, the brake apparatus 40 includes a brake pedal 41, a master cylinder 42, a hydraulic circuit 43, and wheel cylinders 44 (44FL, 44FR, 44RL, and 44RR).

The braking forces of the front left wheel WFL, the front right wheel WFR, the rear left wheel WRL, and the rear right wheel WRR are controlled as a result of the braking pressures of the corresponding wheel cylinders 44FL, 44FR, 44RL, and 44RR being controlled by the hydraulic circuit 43 of the brake apparatus 40. The hydraulic circuit 43 includes an unillustrated reservoir, an unillustrated oil pump, and unillustrated various valve apparatuses, and functions as a brake actuator. The hydraulic circuit 43 includes valve apparatuses corresponding to the wheel cylinders 44FL, 44FR, 44RL, and 44RR, respectively. Therefore, these wheel cylinders are controlled individually. As described above, the brake apparatus 40 can apply braking forces individually to the wheels; i.e., the front left wheel WFL, the front right wheel WFR, the rear left wheel WRL, and the rear right wheel WRR (see, for example, Japanese Patent Application Laid-Open (kokai) Nos. 2013-49292 and 2013-256253).

The drive ECU 50, the 4WD ECU 60, and the brake ECU 70 are interconnected to one another through CAN (controller area network) communication in such a manner that the drive ECU 50, the 4WD ECU 60, and the brake ECU 70 can exchange information with one another. ECU is an abbreviation of an electric control unit and is an electronic circuit which includes, as a main component, a microcomputer including a CPU, a ROM, a RAM, a backup RAM (or non-volatile memory), and an interface I/F. The CPU realizes various functions which will be described later by executing instructions (routines) stored in the memory (ROM). Some or all of these ECUs may be integrated into a single ECU.

The drive ECU 50 is electrically connected to various types of sensors, including an accelerator opening sensor 81 and a shift position sensor 82, and receives output signals from these sensors. The accelerator opening sensor 81 generates an output signal representing the depressed amount (hereinafter also referred to as the "accelerator opening") AP of an accelerator pedal 81a provided to be operated by a driver. The shift position sensor 82 generates output signals (a D-range signal and a non-D-range signal) representing the shift position Tp of the primary transmission 22. The drive ECU 50 sends to the drive apparatus 20 various signals for controlling the drive apparatus 20.

The 4WD ECU 60 is electrically connected to various types of sensors, including rotational speed sensors 83 (83FL, 83FR, 83RL, and 83RR), and receives output signals from these sensors. Each rotational speed sensor 83 generates one pulse every time a corresponding wheel rotates a constant angle. The 4WD ECU 60 counts the number NP of pulses generated by the rotational speed sensor 83 per unit time. The 4WD ECU 60 obtains, from the count value, the rotational speed of the wheel for which that rotational speed sensor 83 is provided. The 4WD ECU 60 calculates the wheel speeds Vw (Vwfl, Vwfr, Vwrl, and Vwrr) of the wheels on the basis of their rotational speeds.

Further, the 4WD ECU 60 calculates, as the body speed Vb of the vehicle 10, the average of three wheel speeds selected from the four wheel speeds Vwfl, Vwfr, Vwrl, and Vwrr by removing the highest wheel speed therefrom.

The 4WD ECU 60 is electrically connected to the final gear apparatus for rear wheels 35 and controls the coupling torques of the first clutch 361 and the second clutch 362.

The brake ECU 70 is electrically connected to a steering angle sensor 84, a yaw rate sensor 85, a lateral acceleration sensor 86, a longitudinal acceleration sensor 87, and a master cylinder pressure sensor 88, and receives output signals from these sensors. The steering angle sensor 84 generates an output signal representing the steering angle St of a steering wheel 84a provided to be operated by the driver. The yaw rate sensor 85 generates an output signal representing the yaw rate Yr of the vehicle 10. The lateral acceleration sensor 86 generates an output signal representing the lateral acceleration Gy of the vehicle 10. The longitudinal acceleration sensor 87 generates an output signal representing the longitudinal acceleration Gx of the vehicle 10. The master cylinder pressure sensor 88 generates an output signal representing the master cylinder pressure Pm. Notably, each of the steering angle sensor 84, the yaw rate sensor 85, and the lateral acceleration sensor 86 outputs a positive value when the vehicle 10 is turning leftward. The longitudinal acceleration sensor 87 outputs a positive value when the vehicle 10 is accelerating.

(Outline of Operation)

The first apparatus executes "driving force yaw moment control (hereinafter referred to as "driving force DYC")" and "braking force yaw moment control (hereinafter referred to as "braking force DYC")" which will be described later, while performing mutual adjustment. Notably, "DYC" is an abbreviation of "dynamic yaw control."

<Driving Force DYC>

When a predetermined driving force DYC execution permission condition (which will be described later) is satisfied after the vehicle 10 has started a turning operation, the first apparatus executes the driving force DYC which applies a driving force only to the rear wheel on the turning locus outer side, thereby generating a yaw moment in the turning direction in the vehicle 10.

Figure 3A:
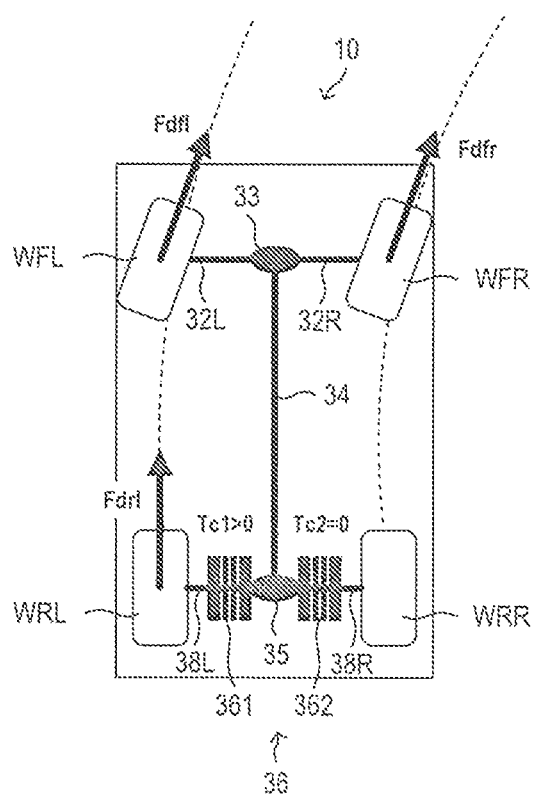

More specifically, in the case where the vehicle 10 turns rightward as shown in FIG. 3A, the first apparatus sets the coupling torque (first coupling torque) Tc1 of the first clutch 361 corresponding to the rear left wheel WRL (the rear wheel on the turning locus outer side) to a value greater than zero, and sets the coupling torque (second coupling torque) Tc2 of the second clutch 362 corresponding to the rear right wheel WRR (the rear wheel on the turning locus inner side) to zero. In this case, the rear left wheel WRL tries to rotate at the same speed as the front left wheel WFL (the front wheel on the turning locus outer side). Meanwhile, since the speed increasing ratio RZ is "1.02," when the turning radius is in an ordinary range, the rear left wheel WRL rotates at a speed lower than the rotational speed Nr of the rear differential case 353. As a result, a driving force Fdrl is generated at the rear left wheel WRL, whereby a clockwise yaw moment can be generated in the vehicle 10. Therefore, the first apparatus can enhance the turning performance of the vehicle 10.

Figure 3B:
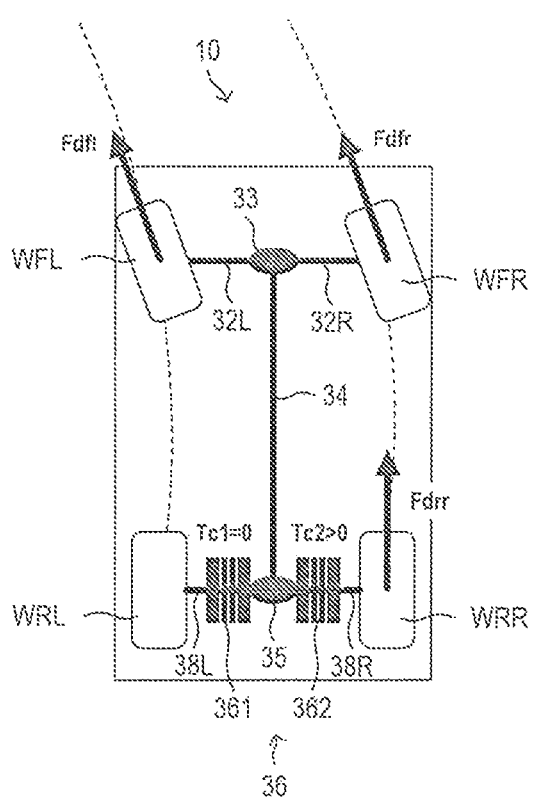

Meanwhile, in the case where the vehicle 10 turns leftward as shown in FIG. 3B, the first apparatus sets the first coupling torque Tc1 to zero, and sets the second coupling torque Tc2 to a value greater than zero. In this case, the rear right wheel WRR tries to rotate at the same speed as the front right wheel WFR (the front wheel on the turning locus outer side). Meanwhile, since the speed increasing ratio RZ is "1.02," when the turning radius is in the ordinary range, the rear right wheel WRR rotates at a speed lower than the rotational speed Nr of the rear differential case 353. As a result, a driving force Fdrr is generated at the rear right wheel WRR, whereby a counterclockwise yaw moment can be generated in the vehicle 10. Therefore, the first apparatus can enhance the turning performance of the vehicle 10.

<Braking Force DYC>

When it becomes necessary to generate a greater yaw moment during execution of the driving force DYC (namely, when a predetermined braking force DYC execution condition (which will be described later) is satisfied), the first apparatus executes the braking force DYC which applies a braking force to the front wheel on the turning locus inner side so as to decrease the wheel speed of the front wheel, thereby generating a yaw moment in the turning direction in the vehicle 10. Notably, the braking force DYC execution condition in the present example is a condition which is satisfied when the increasing magnitude |Gy| of lateral acceleration exceeds a predetermined lateral acceleration threshold Gyth.

<Adjustment of the Driving Force DYC Accompanying Execution of the Braking Force DYC>

Further, after having started the braking force DYC, the first apparatus decreases the driving force applied to the rear wheel on the turning locus outer side by the driving force DYC by an amount corresponding to the braking force applied to the front wheel on the turning locus inner side, and finally decreases the driving force to "0." As a result, the first apparatus prevents the rear wheel on the turning locus outer side from generating an anti-spin moment in the vehicle 10. The above is the outline of operation of the first apparatus.

(Reason why the Driving Force DYC is Adjusted During Execution of the Braking Force DYC)

Figure 4A:
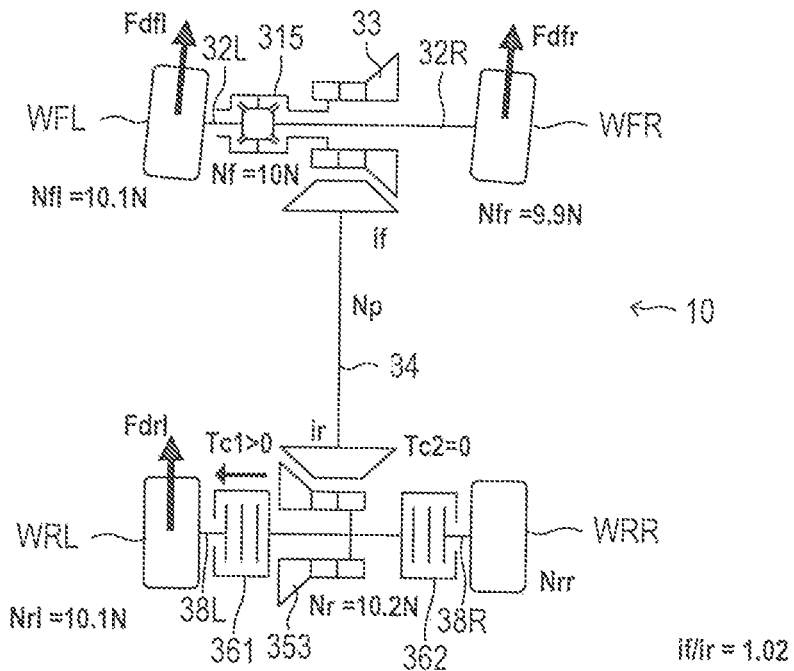

Here, it is assumed that the first apparatus is executing the driving force DYC during the rightward turning of the vehicle 10 and is generating a driving force Fdrl at the rear left wheel WRL (the rear wheel on the turning locus outer side) as shown in FIG. 4A. Notably, since the first apparatus sets the second coupling torque Tc2 to zero at that time, the driving force generated at the rear right wheel WRR (the rear wheel on the turning locus inner side) is zero. Further, it is assumed that a driving force Fdfl is generated at the front left wheel WFL and a driving force Fdfr is generated at the front right wheel WFR.

Further, it is assumed that the magnitude of the rotational speed Nf of the front differential case 315 is 10N (rpm), and the magnitude of the rotational speed Nfl of the front left wheel WFL and the magnitude of the rotational speed Nfr of the front right wheel WFR are 10.1N and 9.9N, respectively. Further, since it can be considered that the distance between the rear left wheel WRL and the turning center is equal to the distance between the front left wheel WFL and the turning center, the rotational speed Nrl of the rear left wheel WRL becomes 10.1N equal to the rotational speed Nfl of the front left wheel WFL under the assumption that the rear left wheel WRL is not slipping.

Meanwhile, the rotational speed Nr of the rear differential case 353 is 10.2N as calculated by the above-mentioned Expression (4), and is higher than the rotational speed Nrl (=10.1N) of the rear left wheel WRL which is not slipping. Accordingly, in this case, the driving torque is transmitted from the rear differential case 353 to the rear left wheel WRL, so that a driving force Fdrl is generated at the rear left wheel WRL.

Figure 4B:
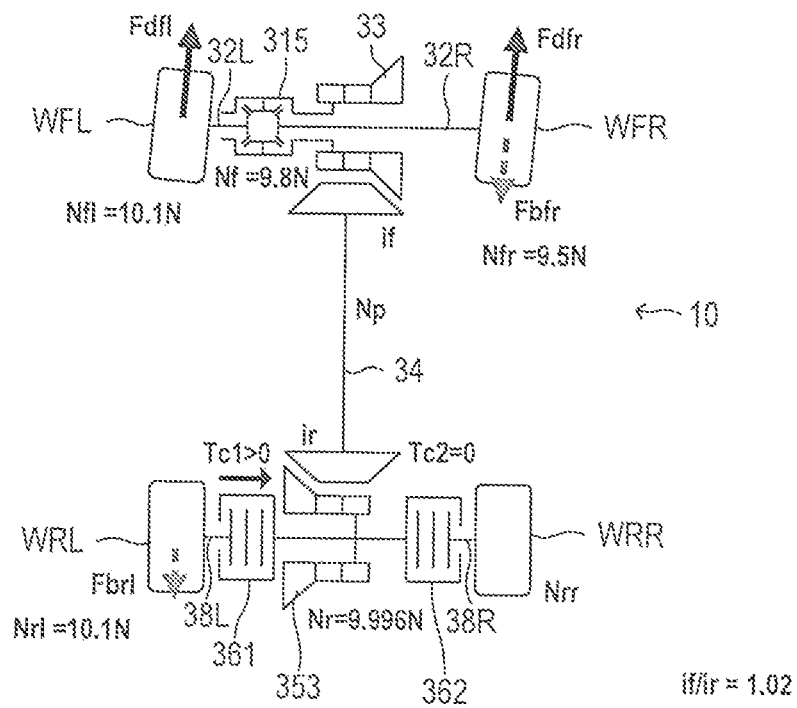

Next, it is assumed that the braking force DYC had been started during execution of the driving force DYC so as to apply a braking force Fbfr to the front right wheel WFR, so that the rotational speed Nfr of the front right wheel WFR has decreased from 9.9N to 9.5N as shown in FIG. 4B. In this case, under the assumption that the rotational speed Nfl of the front left wheel WFL is 10.1N as in the case shown in FIG. 4A, the rotational speed Nf of the front differential case 315 becomes 9.8N as calculated by the above-mentioned Expression (1). As a result, the rotational speed Nr of the rear differential case 353 becomes 9.996N as calculated by the above-mentioned Expression (4).

Incidentally, since the rotational speed Nrl of the rear left wheel WRL is 10.1N which is equal to the rotational speed Nfl of the front left wheel WFL, the rotational speed Nrl of the rear left wheel WRL is higher than the rotational speed Nr of the rear differential case 353 (=9.996N). In this case, the rotational speed Nrl of the rear left wheel WRL decreases toward the rotational speed Nr of the rear differential case 353. Namely, in this case, rotational torque is transmitted from the rear left wheel WRL to the rear differential case 353. As a result, a braking force Fbrl is substantially generated at the rear left wheel WRL, and the rear left wheel WRL therefore generates an anti-spin moment. In view of this, as described above, after having started the braking force DYC, the first apparatus decreases the driving force applied to the rear wheel on the turning locus outer side by the driving force DYC by an amount corresponding to the braking force applied to the front wheel on the turning locus inner side, and finally decreases the driving force to "0."

(Specific Operation)

Actual operation of the first apparatus will now be described. The CPU of the 4WD ECU 60 (hereinafter simply referred to as the "CPU") executes a coupling control routine illustrated by a flowchart in FIG. 5 every time a constant time elapses. In the below, the operation will be described for each of different cases.

(1) Case where the Driving Force DYC Execution Permission Condition is not Satisfied The CPU starts the routine from Step 500 at a predetermined timing and proceeds to Step 505 so as to determine whether the driving force DYC execution permission condition is satisfied. The driving force DYC execution permission condition is satisfied upon satisfaction of all three conditions which will be described below. As can be understood from the following three conditions, when the driving force DYC execution permission condition is satisfied, the vehicle 10 is turning.

(Condition 1) The shift range signals indicate that the shift position Tp is the D range.

(Condition 2) The body speed Vb is higher than a predetermined speed threshold Vbth.

(Condition 3) The steering angle absolute value |St| is greater than a predetermined steering angle threshold Stth.

Under the above-mentioned assumption, the driving force DYC execution permission condition is not satisfied. Accordingly, the CPU makes a "No" determination at Step 505 and proceeds to Step 510. At Step 510, the CPU sets both the first coupling torque Tc1 and the second coupling torque Tc2 to zero. As a result, the vehicle 10 performs two-wheel drive travel (namely, front-wheel drive travel) by using the front left wheel WFL and the front right wheel WFR as drive wheels. Subsequently, the CPU proceeds directly to Step 595 so as to tentatively terminate the present routine.

(2) Case where the Driving Force DYC Execution Permission Condition is Satisfied and the Magnitude of Lateral Acceleration of the Vehicle is Increasing Under the above-mentioned assumption, the CPU makes a "Yes" determination at Step 505 and proceeds to Step 515 so as to permit three-wheel drive travel. Namely, execution of the driving force DYC is permitted. Accordingly, the CPU performs the following processing at Step 515.

Figure 6:
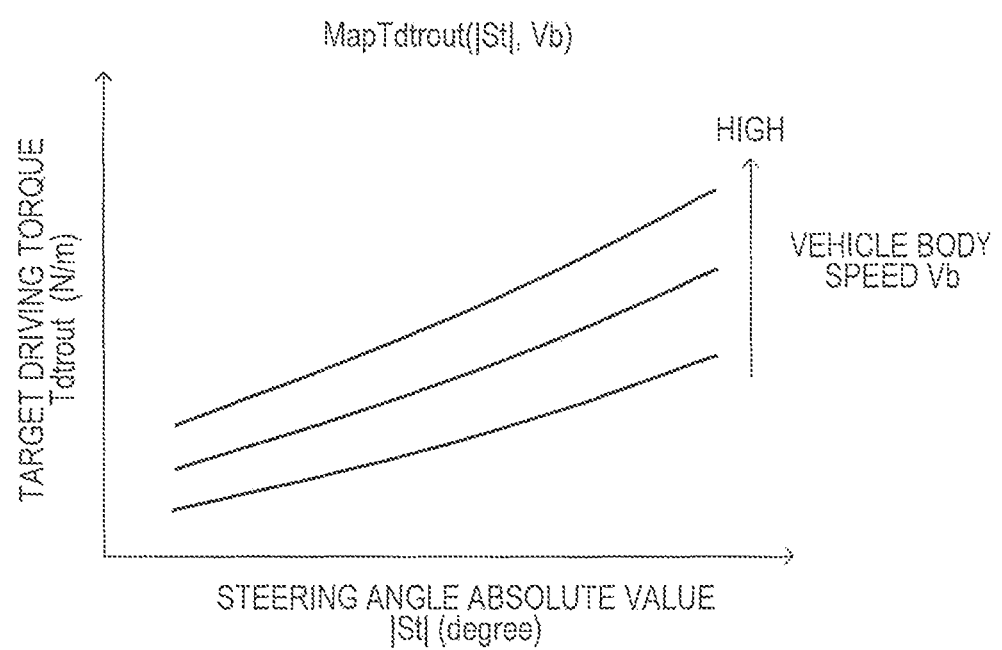
FIG. 6 is a diagram for illustrating the relation among steering angle absolute value, vehicle body speed, and driving torque of the rear wheel on the turning locus outer side.

The CPU computes a target driving torque Tdtrout of the rear wheel on the turning locus outer side by applying the obtained "steering angle absolute value |St| and body speed Vb" to a lookup table MapTdtrout(|St|, Vb) shown in FIG. 6. According to the table MapTdtrout(|St|, Vb), the target driving torque Tdtrout increases with the steering angle absolute value |St|, and the higher the body speed Vb, the larger the target driving torque Tdtrout. This table MapTdtrout(|St|, Vb) and lookup tables described below are obtained in advance through simulation, experiments, etc., and are stored in the ROM in the 4WD ECU 60.

Figure 7:
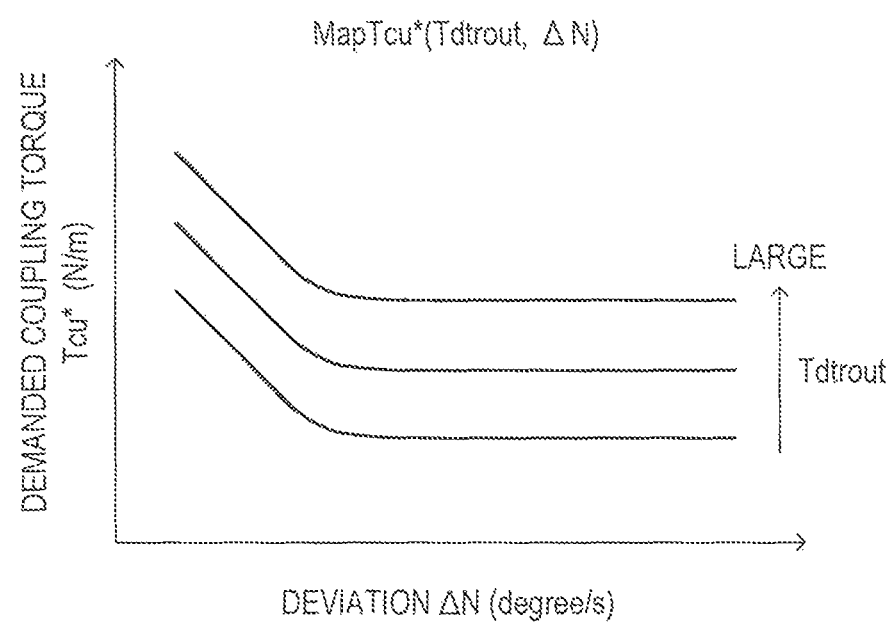
FIG. 7 is a diagram for illustrating the relation among driving torques of the rear wheel on the turning locus outer side, the deviation between the rotational speed of a drive output part and the rotational speed of the rear wheel on the turning locus outer side, and demanded coupling torque of a coupling apparatus on the turning locus outer side.

The CPU computes a demanded coupling torque Tcu* by applying the obtained "target driving torque Tdtrout and rotational speed deviation $\Delta N$" to a lookup table MapTcu* (Tdtrout, $\Delta N$) shown in FIG. 7. The deviation $\Delta N$ is the deviation $\Delta N$ between the rotational speed Nr of the rear differential case 353 and the rotational speed Nrout (Vwrl or Vwrr) of the rear wheel on the turning locus outer side ($\Delta N$=Nr−Nrout). According to the table MapTcu* (Tdtrout, $\Delta N$), the demanded coupling torque Tcu* increases with the target driving torque Tdtrout. Further, the demanded coupling torque Tcu* decreases as the deviation $\Delta N$ increases when the deviation $\Delta N$ is less than a predetermined value and assumes an approximately constant value when the deviation $\Delta N$ is equal to or greater than the predetermined value. The demanded coupling torque Tcu* is a coupling torque necessary to transmit a torque equal to the target driving torque Tdtrout to the rear wheel on the turning locus outer side.

Figure 8:
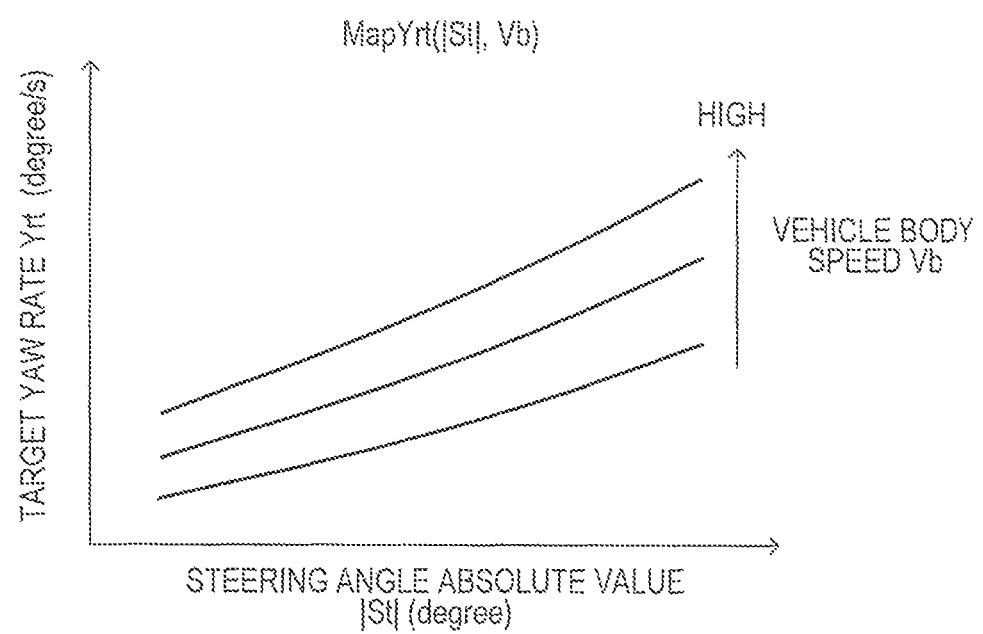
FIG. 8 is a diagram for illustrating the relation among steering angle absolute value, vehicle body speed, and target yaw rate.

The CPU computes a target yaw rate Yrt by applying the obtained "steering angle absolute value |St| and body speed Vb" to a lookup table MapYrt(|St|, Vb) shown in FIG. 8. According to the table MapYrt(|St|, Vb), the target yaw rate Yrt increases with the steering angle absolute value |St|, and the higher the body speed Vb, the higher the target yaw rate Yrt.

Subsequently, the CPU proceeds to Step 520 so as to determine whether the magnitude |Gy| of lateral acceleration is increasing (d|Gy|/dt≥0). Under the above-mentioned assumption, the magnitude |Gy| of lateral acceleration is increasing. Accordingly, the CPU makes a "Yes" determination at Step 520 and proceeds to Step 525 so as to determine whether the magnitude |Gy| of lateral acceleration is smaller than a predetermined lateral acceleration threshold Gyth. Namely, the CPU determines whether the braking force DYC execution condition is not satisfied.

In the case where the magnitude |Gy| of lateral acceleration is smaller than the predetermined lateral acceleration threshold Gyth, the CPU makes a "Yes" determination at Step 525 and proceeds to Step 527. At Step 527, the CPU executes the driving force DYC by performing the following processing.

The CPU adjusts the coupling torque Tcuout of the clutch corresponding to the rear wheel on the turning locus outer side such that the coupling torque Tcuout coincides with the demanded coupling torque Tcu*.

The CPU feedback-controls the coupling torque Tcuout such that the actual yaw rate Yr approaches the target yaw rate Yrt. Notably, this feedback control is not necessarily required.

As a result, a "driving force Fdrout corresponding to the target driving torque Tdtrout" is generated at the rear wheel on the turning locus outer side. Subsequently, the CPU proceeds to Step 595 so as to tentatively terminate the present routine.

Figure 9A:
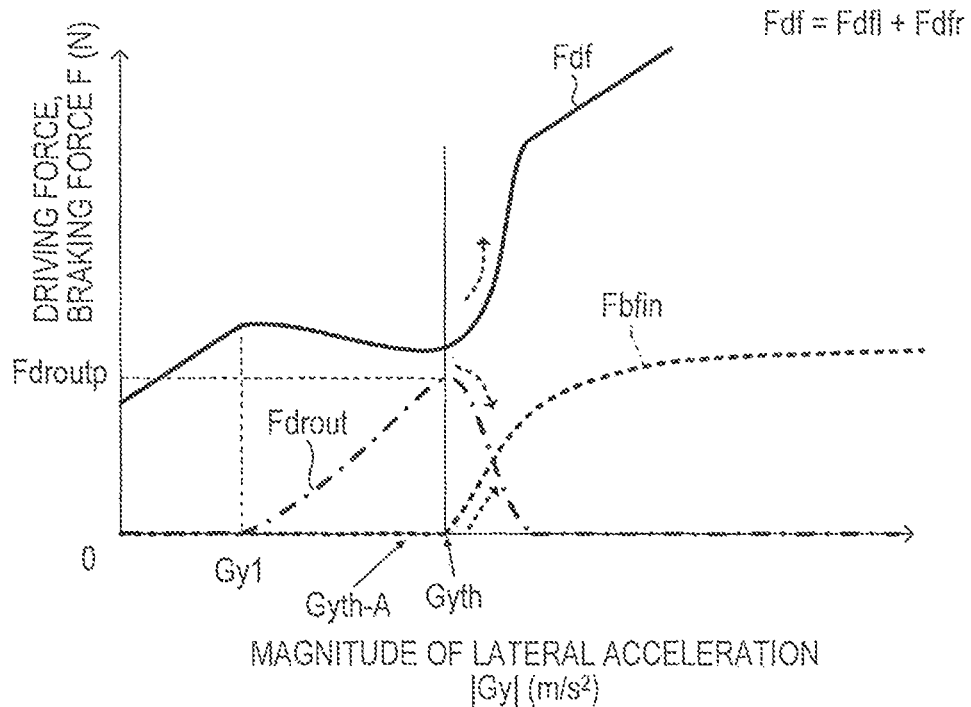
FIG. 9A is a diagram for illustrating changes, with the magnitude of lateral acceleration, in the front wheel driving force, the rear wheel driving force on the turning locus outer side, and the front wheel braking force on the turning locus inner side when the vehicle illustrated in FIG. 1 is turning and the magnitude of lateral acceleration increases.

For example, in the case where the vehicle 10 is being accelerated after having started the turning, as shown in FIG. 9A, the magnitude |Gy| of lateral acceleration increases from "0," and a front wheel driving force Fdf which is the resultant force of the driving force Fdfl of the front left wheel WFL and the driving force Fdfr of the front right wheel WFR increases gradually. Then, the driving force DYC execution permission condition is satisfied, and the driving force DYC is started. The magnitude |Gy| of lateral acceleration at that time is a value Gy1. Accordingly, when the magnitude |Gy| of lateral acceleration becomes equal to or larger than the value Gy1, a driving force Fdrout is generated at the rear wheel on the turning locus outer side.

As a result of an increase in the steering angle absolute value |St| and/or an increase in the body speed Vb, the magnitude |Gy| of lateral acceleration increases, and simultaneously, the target driving torque Tdtrout increases. Therefore, the rear wheel driving force Fdrout on the turning locus outer side increases as the magnitude |Gy| of lateral acceleration increases.

During execution of the driving force DYC, the CPU divides the total driving force of the vehicle 10 determined in accordance with the accelerator opening AP Into the front wheel driving force Fdf and the rear wheel driving force Fdrout on the turning locus outer side (the CPU divides the total driving force in the same manner in the cases described below). Accordingly, as shown in FIG. 9A, the front wheel driving force Fdf decreases as the rear wheel driving force Fdrout on the turning locus outer side increases.

When the body speed Vb increases or the magnitude |St| of steering angle increases as a result of further rotation of the steering wheel 84a in such a state (state in which the driving force DYC has been started), the tendency of understeer of the vehicle 10 increases. Therefore, the magnitude |Gy| of lateral acceleration increases and becomes equal to or larger than the lateral acceleration threshold Gyth.

In this case, the braking force DYC execution condition is satisfied. Therefore, when the CPU proceeds to Step 525, the CPU makes a "No" determination, and proceeds to Step 530 so as to determine whether the rear wheel driving force Fdrout on the turning locus outer side is zero.

In the case where the driving force DYC has been started and the magnitude |Gy| of lateral acceleration increases continuously, since the target driving torque Tdtrout is not "0," the rear wheel driving force Fdrout on the turning locus outer side is also not zero. In this case, the CPU makes a "No" determination at Step 530 and proceeds to Step 535 so as to perform the following processing.

Figure 10:
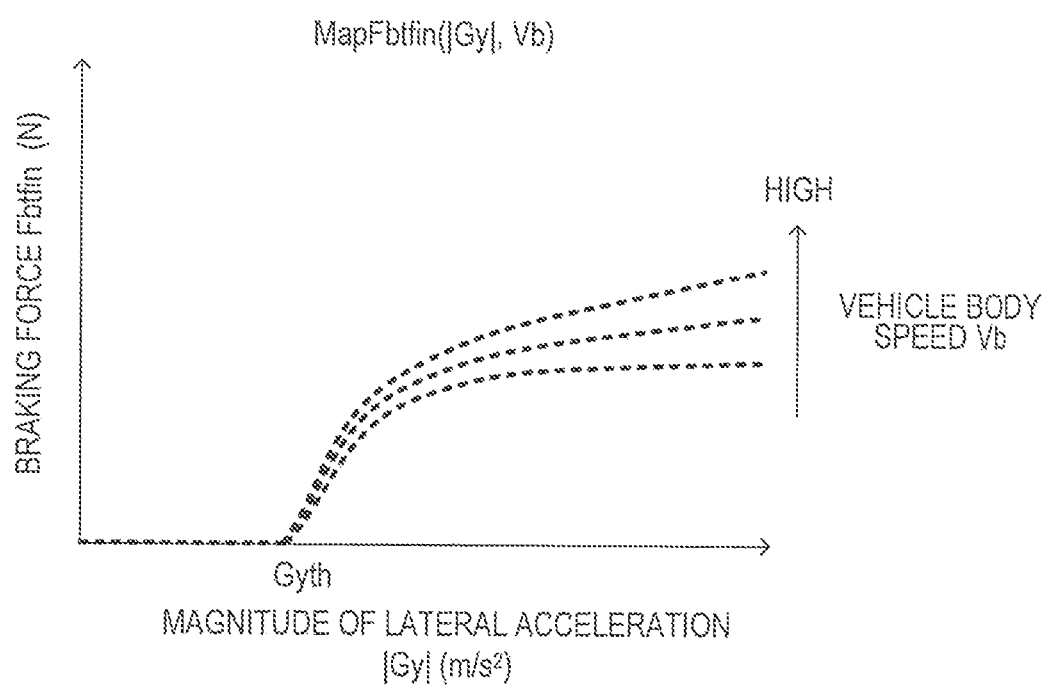
FIG. 10 is a diagram for illustrating the relation among the magnitude of lateral acceleration, vehicle body speed, and braking force applied to the front wheel on the turning locus inner side.

The CPU computes a target braking force Fbtfin by applying the obtained "magnitude |Gy| of lateral acceleration and body speed Vb" to a lookup table MapFbtfin(|Gy|, Vb) shown in FIG. 10. Then, the CPU controls the braking pressure of the corresponding wheel cylinder 44 such that the front wheel braking force Fbfin on the turning locus inner side coincides with the computed front wheel target braking force Fbtfin on the turning locus inner side. As a result, the braking force DYC is started.

According to the table MapFbtfin(|Gy|, Vb), when the magnitude |Gy| of lateral acceleration is equal to or larger than the lateral acceleration threshold Gyth, the front wheel target braking force Fbtfin on the turning locus inner side increases from "0" as the magnitude |Gy| of lateral acceleration increases, and the higher the body speed Vb, the larger the front wheel target braking force Fbtfin.

The CPU calculates the difference (|Fdroutp|−|Fbtfin|) between the magnitude |Fdroutp| of the rear wheel driving force on the turning locus outer side and the magnitude |Fbtfin| of the front wheel target braking force on the turning locus inner side at the time when the CPU made a "No" determination at Step 525 (namely, at the time when the magnitude |Gy| of lateral acceleration has exceeded the lateral acceleration threshold Gyth).

The CPU applies a driving force corresponding to the difference (|Fdroutp|−|Fbtfin|) to the rear wheel on the turning locus outer side, as the rear wheel driving force Fdrout on turning locus outer side.

As described above, the CPU decreases the rear wheel driving force Fdrout on the turning locus outer side by a force corresponding to the front wheel braking force Fbfin on the turning locus inner side for substituting gradually the front wheel braking force Fbfin for the rear wheel driving force Fdrout. In other words, when the braking force Fbfin attributable to the braking force DYC is generated at the front wheel on the turning locus inner side, the CPU decreases the rear wheel driving force Fdrout on the turning locus outer side toward zero. At that time, the CPU increases the front wheel driving force Fdf by an amount corresponding to the amount of decrease in the rear wheel driving force Fdrout on the turning locus outer side.

As a result, as shown in FIG. 9A, as the magnitude |Gy| of lateral acceleration increases, the braking force Fbfin and the front wheel driving force Fdf increase, and the rear wheel driving force Fdrout decreases. The above-mentioned control of rendering the braking force Fbfin of the front wheel (primary drive wheel) on the turning locus inner side coincident with the target braking force (first target braking force) Fbtfin changing with the travel state of the vehicle 10 and decreasing the coupling torque of one of the first clutch 361 and the second clutch 362 which corresponds to the rear wheel on the turning locus outer side will also be referred to as the "first control."

When this state continues, the rear wheel driving force Fdrout reaches zero. In this case, when the CPU proceeds to Step 530, the CPU makes a "Yes" determination and proceeds to Step 540. At Step 540, the CPU computes the front wheel target braking force Fbtfin using the table MapFbtfin (|Gy|, Vb) of FIG. 10 in the same manner as at Step 535. Further, the CPU controls the braking pressure of the corresponding wheel cylinder 44 such that the front wheel braking force Fbfin on the turning locus inner side coincides with the computed target braking force Fbtfin. As a result, the braking force Fbfin of the front wheel on the turning locus inner side increases as the magnitude |Gy| of lateral acceleration increases.

Figure 9B:
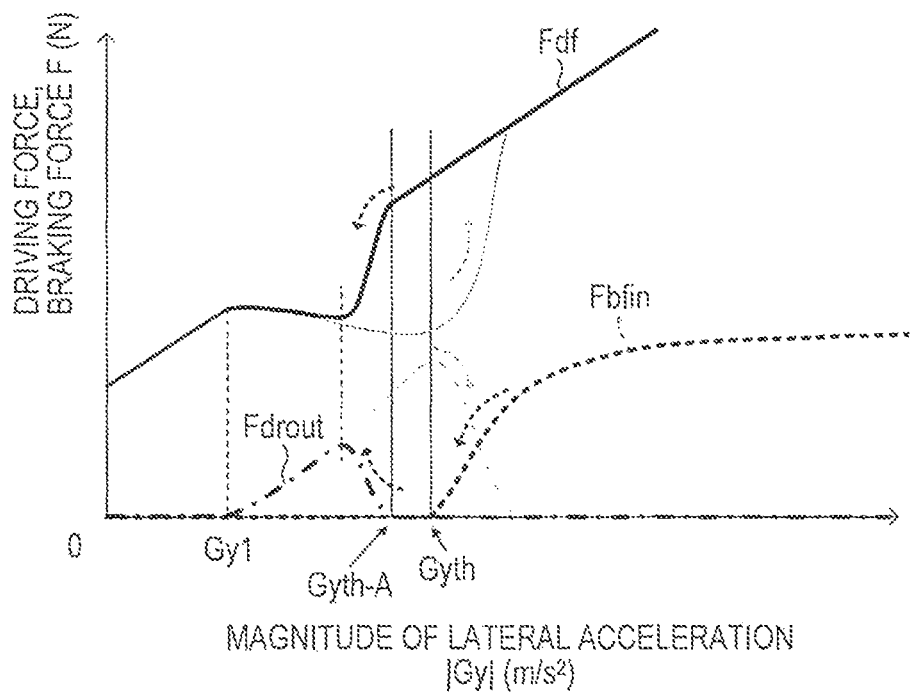
FIG. 9B is a diagram for illustrating changes, with the magnitude of lateral acceleration, in the front wheel driving force, the rear wheel driving force on the turning locus outer side, and the front wheel braking force on the turning locus inner side when the vehicle illustrated in FIG. 1 is turning and the magnitude of lateral acceleration decreases.

(3) Case where the Driving Force DYC Execution Permission Condition is Satisfied and the Magnitude of Lateral Acceleration of the Vehicle is Decreasing (See FIG. 9B)

In this case, the CPU makes a "Yes" determination at Step 505, executes the processing of Step 515, makes a "No" determination at Step 520, and proceeds to Step 545. At Step 545, the CPU determines whether the magnitude |Gy| of lateral acceleration is equal to or larger than a determination value (Gyth−A) which is smaller than the predetermined lateral acceleration threshold by a predetermined value A. The value A is a predetermined positive value. Hereinafter, the determination value (Gyth−A) will be referred to as the "hysteresis threshold."

In the case where the magnitude |Gy| of lateral acceleration is equal to or larger than the predetermined hysteresis threshold (Gyth−A), the CPU makes a "Yes" determination at Step 545 and proceeds to Step 550 so as to determine whether the rear wheel driving force Fdrout on the turning locus outer side is larger than zero.

In the case where the rear wheel driving force Fdrout is zero, the CPU makes a "No" determination at Step 550 and proceeds directly to Step 560. At Step 560, the CPU computes the front wheel target braking force Fbtfin using the table MapFbtfin(|Gy|, Vb) of FIG. 10 in the same manner as at Step 535 and Step 540. Further, the CPU controls the braking pressure of the corresponding wheel cylinder such that the front wheel braking force Fbfin on the turning locus inner side coincides with the computed target braking force Fbtfin.

As a result, as shown in FIG. 9B, the braking force Fbfin of the front wheel on the turning locus inner side decreases as the magnitude |Gy| of lateral acceleration decreases. When the magnitude |Gy| of lateral acceleration decreases to the lateral acceleration threshold Gyth, the braking force Fbfin of the front wheel on the turning locus inner side becomes "0."

In contrast, in the case where the rear wheel driving force Fdrout is larger than zero at the time when the CPU executes the processing of Step 550, the CPU makes a "Yes" determination at Step 550 and proceeds to Step 555. At Step 555, the CPU decreases a target value Fdtrout of the rear wheel driving force Fdrout on the turning locus outer side by a predetermined value. Namely, the CPU decreases the rear wheel driving force Fdrout on the turning locus outer side toward zero. Subsequently, the CPU proceeds to the above-mentioned Step 560.

Figure 11A:
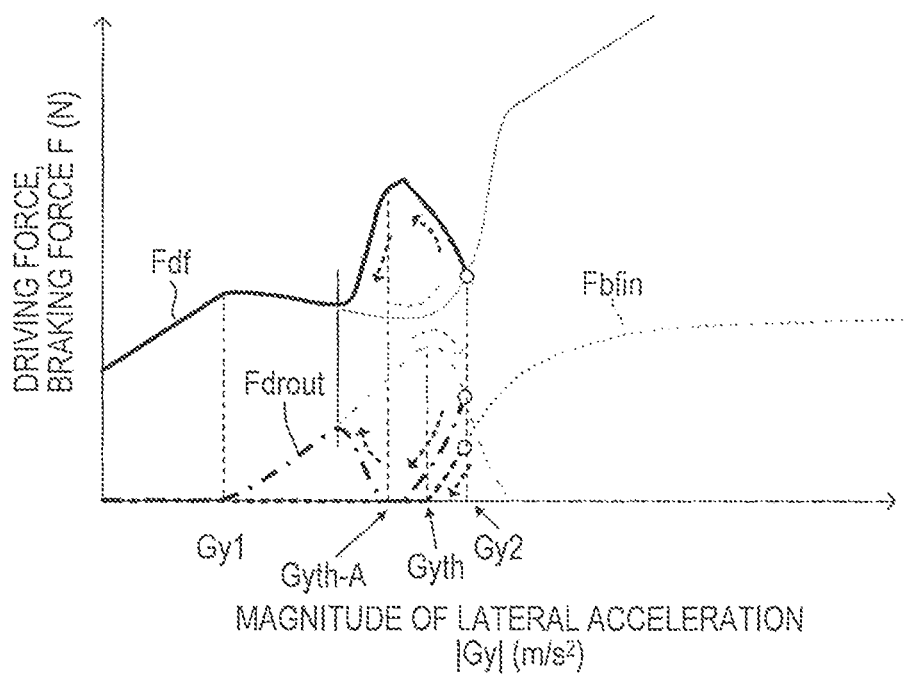
FIG. 11A is a diagram for Illustrating changes, with the magnitude of lateral acceleration, in the front wheel driving force, the rear wheel driving force on the turning locus outer side, and the front wheel braking force on the turning locus inner side when the vehicle illustrated in FIG. 1 is turning in the case where the direction of change of the magnitude of lateral acceleration changes to a decreasing direction while the rear wheel driving force on the turning locus outer side is decreased as a result of the magnitude of lateral acceleration increasing and exceeding a predetermined lateral acceleration threshold.

As a result, as shown in FIG. 11A, in the case where the CPU proceeds to Step 555 when the magnitude |Gy| of lateral acceleration is Gy2, as the magnitude |Gy| of lateral acceleration decreases, the braking force Fbfin of the front wheel on the turning locus inner side decreases, and the rear wheel driving force Fdrout on the turning locus outer side also decreases gradually. In this case, the CPU decreases the rear wheel driving force Fdrout on the turning locus outer side to zero before the magnitude |Gy| of lateral acceleration reaches the hysteresis threshold (Gyth−A).

As described above, in the case where the magnitude |Gy| of lateral acceleration is increasing, and therefore, the braking force Fbfin of the front wheel on the turning locus inner side is increased and the driving force Fdrout of the rear wheel on the turning locus outer side is decreased, the direction of change of the magnitude |Gy| of lateral acceleration changes from an increasing direction to a decreasing direction. In such a case, the CPU decreases the rear wheel driving force Fdrout on the turning locus outer side toward zero irrespective of the braking force Fbfin of the front wheel on the turning locus inner side.

In the case where, after that point in time, the magnitude |Gy| of lateral acceleration further decreases and becomes smaller than the hysteresis threshold (Gyth−A), the CPU makes a "No" determination at Step 545 and proceeds to Step 565. At Step 565, the CPU determines whether the rear wheel driving force Fdrout on the turning locus outer side is smaller than the target driving force (i.e., the driving force during execution of the driving force DYC determined at Step 515) Fdtrout.

In the case where the rear wheel driving force Fdrout on the turning locus outer side is smaller than the target driving force Fdtrout, the CPU makes a "Yes" determination at Step 565 and proceeds to Step 570 so as to increase the rear wheel driving force Fdrout on the turning locus outer side by a predetermined value. Namely, the CPU increases the rear wheel driving force Fdrout on the turning locus outer side toward the target driving force Fdtrout at a predetermined gradient.

Meanwhile, in the case where the rear wheel driving force Fdrout on the turning locus outer side is equal to or larger than the target driving force Fdtrout, the CPU makes a "No" determination at Step 565 and proceeds to Step 575. At Step 575, the CPU changes the rear wheel driving force Fdrout on the turning locus outer side in accordance with the target driving force Fdtrout determined at Step 515.

As described above, in the case where the magnitude |Gy| of lateral acceleration is decreasing, the CPU does not generate the rear wheel driving force Fdrout on the turning locus outer side in a period between the point in time when the front wheel braking force Fbfin on the turning locus inner side becomes zero (namely, at the point in time when the magnitude |Gy| of lateral acceleration reaches the lateral acceleration threshold Gyth) and the point in time when the magnitude |Gy| of lateral acceleration decreases to the hysteresis threshold (Gyth−A) (see FIG. 9B). As a result, it is possible to avoid frequent start and stoppage of execution of the driving force DYC even in a situation in which the magnitude |Gy| of lateral acceleration increases and decreases frequently.

Figure 11B:
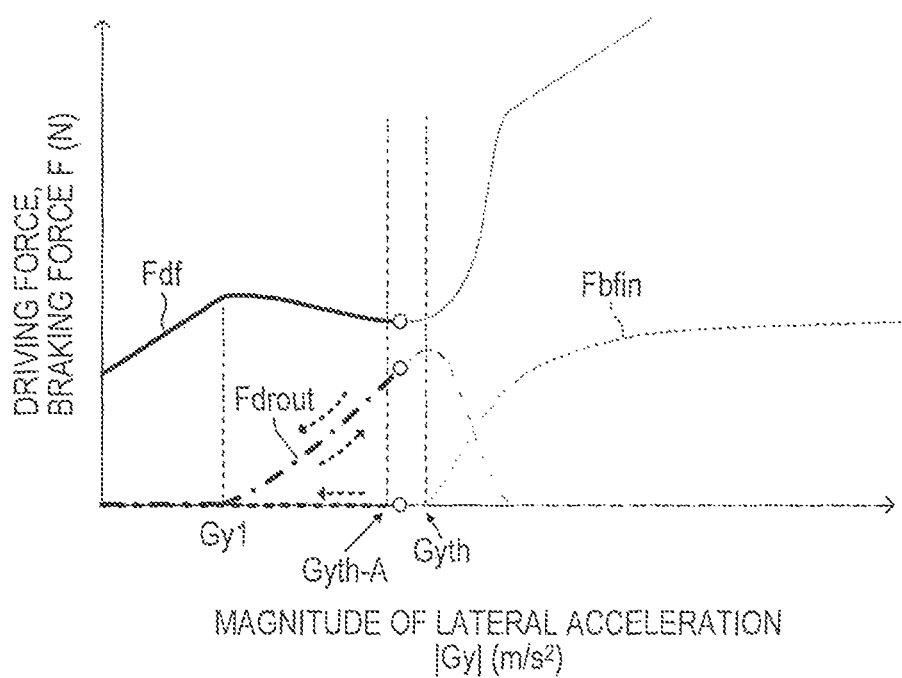
FIG. 11B is a diagram for illustrating changes, with the magnitude of lateral acceleration, in the front wheel driving force, the rear wheel driving force on the turning locus outer side, and the front wheel braking force on the turning locus inner side when the vehicle illustrated in FIG. 1 is turning in the case where the direction of change of the magnitude of lateral acceleration changes to the decreasing direction before the magnitude of lateral acceleration exceeds the predetermined lateral acceleration threshold.

Further, in the case where the increasing magnitude |Gy| of lateral acceleration starts to decrease before reaching the lateral acceleration threshold Gyth, as shown in FIG. 11B, the CPU decreases the rear wheel driving force Fdrout on the turning locus outer side to follow the track (namely, the target driving force Fdtrout) along which the rear wheel driving force Fdrout has been increased until that point in time.

As described above, when the braking force DYC is started during execution of the driving force DYC, the first apparatus decreases the driving force applied to the rear wheel on the turning locus outer side through the driving force DYC by an amount corresponding to the braking force applied to the front wheel on the turning locus inner side through the braking force DYC, and finally decreases the driving force to "0." As a result, the first apparatus can avoid a situation in which the rear wheel on the turning locus outer side generates an anti-spin moment in the vehicle 10.

Second Embodiment

Next, a travel control apparatus according to a second embodiment of the present disclosure (hereinafter referred to as the "second apparatus") will be described. The second apparatus differs from the first apparatus in the point that when the braking force DYC execution condition is satisfied during execution of the driving force DYC, the second apparatus applies a braking force to the rear wheel on the turning locus inner side, while generating the rear wheel driving force on the turning locus outer side (namely, while continuing the execution of the driving force DYC). Accordingly, this difference will be mainly described below.

<Application of Braking Force to the Rear Wheel (Secondary Drive Wheel) on the Turning Locus Inner Side>

Figure 12:
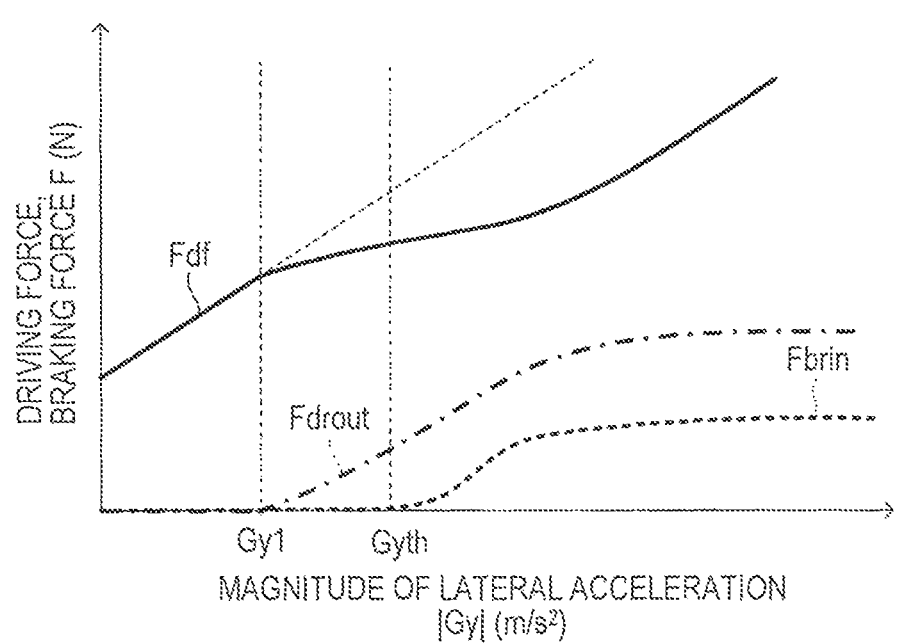
FIG. 12 is a diagram for illustrating changes, with the magnitude of lateral acceleration, in the front wheel driving force, the rear wheel driving force on the turning locus outer side, and the rear wheel braking force on the turning locus inner side when a vehicle to which a travel control apparatus according to a second embodiment of the present disclosure is applied is turning.

As shown in FIG. 12, the driving force Fdrout of the rear wheel on the turning locus outer side is generated when the magnitude |Gy| of lateral acceleration becomes Gy| after the driving force DYC execution permission condition has been satisfied. Like the first apparatus, the second apparatus computes the target driving torque Tdtrout using the table MapTdtrout(|St|, Vb) of FIG. 6. Further, after computation of the target driving torque Tdtrout, the second apparatus computes the target yaw rate Yrt using the table MapYrt (|St|, Vb) of FIG. 8. The second apparatus feedback-controls the coupling torque Tcuout of the coupling apparatus corresponding to the rear wheel on the turning locus outer side such that the deviation ΔYr between the computed target yaw rate Yrt and the obtained yaw rate Yr becomes the smallest.

The second apparatus computes the target braking force Fbtrin of the rear wheel on the turning locus inner side by applying the obtained magnitude |Gy| of lateral acceleration and body speed Vb to an unillustrated table MapFbtrin(|Gy|, Vb). Further, the second apparatus controls the wheel cylinder 44RL or 44RR corresponding to the rear wheel on the turning locus inner side such that the braking force Fbrin of the rear wheel on the turning locus inner side coincides with the computed target braking force Fbtrin. Like the target braking force Fbtfin of the front wheel on the turning locus inner side, the target braking force Fbtrin of the rear wheel on the turning locus inner side is generated when the magnitude |Gy| of lateral acceleration exceeds the predetermined lateral acceleration threshold Gyth and increases with the magnitude |Gy| of lateral acceleration; however, the target braking force Fbtrin gradually converges to a predetermined braking force. Further, the higher the body speed Vb, the larger the target braking force Fbtrin. The above-mentioned control of applying (generating) a target braking force (second target braking force) Fbtrin to the rear wheel (secondary drive wheel) on the turning locus inner side which is determined on the basis of the lateral acceleration Gy and the body speed Vb using the brake apparatus 40 will also referred to as the "second control."

(Specific Operation)
<Coupling Control>

Actual operation of the second apparatus will now be described. The CPU of a 4WD ECU 60A of the second apparatus executes a "coupling control routine" illustrated by a flowchart in FIG. 13 every time a constant time elapses.
(1) Case where the Driving Force DYC Execution Permission Condition is not Satisfied Under the above-mentioned assumption, the driving force DYC execution permission condition is not satisfied. Accordingly, when the CPU starts the routine from Step 1300 at a predetermined timing and proceeds to Step 1310, the CPU makes a "No" determination and proceeds to Step 1320. At Step 1320, the CPU causes the vehicle 10 to perform "two-wheel drive travel" (namely, front-wheel drive travel) in which driving force is generated by the front left wheel WFL and the front right wheel WFR. Subsequently, the CPU proceeds to Step 1395 so as to tentatively terminate the present routine.

(2) Case where the Driving Force DYC Execution Permission Condition is Satisfied and the Magnitude of Lateral Acceleration is Smaller than the Predetermined Lateral Acceleration Threshold Under the above-mentioned assumption, the driving force DYC execution permission condition is satisfied. Accordingly, the CPU makes a "Yes" determination at Step 1310 and proceeds to Step 1330. At Step 1330, the CPU permits three-wheel drive travel in which three wheels (i.e., the front left wheel WFL, the front right wheel WFR, and the rear wheel on the turning locus outer side) are used as drive wheels. Subsequently, the CPU proceeds to Step 1340 so as to determine whether the magnitude |Gy| of lateral acceleration is equal to or larger than the predetermined lateral acceleration threshold Gyth. Under the above-mentioned assumption, the magnitude |Gy| of lateral acceleration is smaller than the predetermined lateral acceleration threshold Gyth. Accordingly, the CPU makes a "No" determination at Step 1340 and proceeds directly to Step 1395 so as to tentatively terminate the present routine. Accordingly, in this case, the three-wheel drive travel is continued.

(3) Case where the Driving Force DYC Execution Permission Condition is Satisfied, and the Magnitude of Lateral Acceleration is Equal to or Larger than the Predetermined Lateral Acceleration Threshold Under the above-mentioned assumption, the driving force DYC execution permission condition is satisfied. Accordingly, the CPU makes a "Yes" determination at Step 1310, proceeds to Step 1330 so as to permit the three-wheel drive travel, and proceeds to Step 1340. Under the above-mentioned assumption, the magnitude |Gy| of lateral acceleration is equal to or larger than the predetermined lateral acceleration threshold Gyth. Accordingly, the CPU makes a "Yes" determination at Step 1340 and proceeds to Step 1350 so as to determine whether driving force is generated at least one of the rear left wheel WRL and the rear right wheel WRR.

More specifically, the CPU computes the demanded coupling torque Tcu* of the clutch corresponding to the rear wheel on the turning locus outer side using the table MapTcu*(Tdtrout, ΔN) of FIG. 7. When the computed demanded coupling torque Tcu* is equal to or larger than a predetermined torque Tcpre, the CPU determines that driving force is generated at least one of the rear left wheel WRL and the rear right wheel WRR.

In the case where driving force is generated at least one of the rear left wheel WRL and the rear right wheel WRR, the CPU makes a "Yes" determination at Step 1350 and proceeds to Step 1360. At Step 1360, the CPU computes the target braking force Fbtrin of the rear wheel on the turning locus inner side by applying the obtained magnitude |Gy| of lateral acceleration and body speed Vb to the table MapFbtrin(|Gy|, Vb). Further, the CPU controls the brake apparatus 40 such that the braking force Fbrin of the rear wheel on the turning locus inner side coincides with the computed target braking force Fbtrin. Subsequently, the CPU proceeds to Step 1395 and tentatively terminates the present routine.

Meanwhile, in the case where driving force is generated at none of the rear left wheel WRL and the rear right wheel WRR, the CPU makes a "No" determination at Step 1350 and proceeds to Step 1370. At Step 1370, the CPU computes the target braking force Fbtfin of the front wheel on the turning locus inner side using the table MapFbtfin(|Gy|, Vb)

of FIG. 10. Then, the CPU controls the brake apparatus 40 such that the braking force Fbfin of the front wheel on the turning locus inner side coincides with the computed target braking force Fbtfin. Subsequently, the CPU proceeds to Step 1395 and tentatively terminates the present routine.

As described above, in the case where the demand of further increasing the yaw moment in the turning direction arises during execution of the driving force DYC, the second apparatus executes the second control of rendering the braking force Fbrin of the rear wheel (secondary drive wheel) on the turning locus inner side coincident with the second target braking force Fbtrin changing with the travel state of the vehicle 10 (the lateral acceleration Gy and the body speed Vb). Accordingly, even when the second apparatus executes the braking force DYC, the rotational speed Nr of the rear differential case 353 does not decrease. Therefore, there is no possibility that the amount of yaw moment in the turning direction decreases. Therefore, the second apparatus can execute the driving force DYC and the braking force DYC simultaneously.

Third Embodiment

Next, a travel control apparatus according to a third embodiment of the present disclosure (hereinafter referred to as the "third apparatus") will be described. The third apparatus differs from the first apparatus in the point that, when the braking force DYC execution condition is satisfied, the application of braking force to the front wheel on the turning locus inner side is started, and the driving force of the rear wheel on the turning locus outer side is decreased immediately irrespective of the braking force applied to the front wheel on the turning locus inner side (namely, the above-mentioned "substituting" is not performed). Accordingly, this difference will be mainly described below.

Figure 14A:
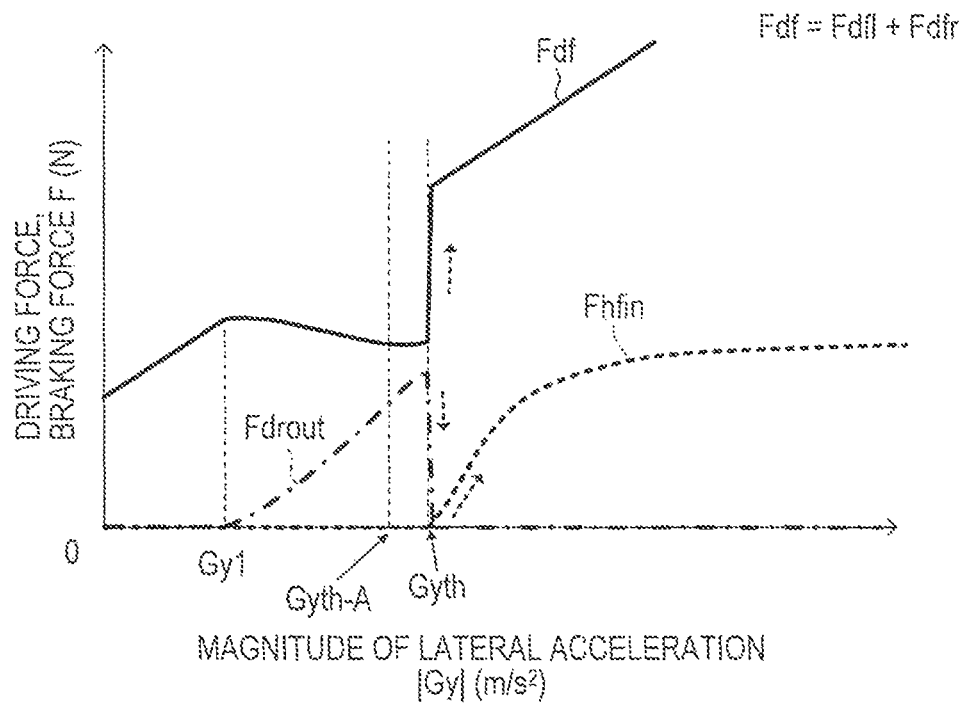
FIG. 14A is a diagram for illustrating changes, with the magnitude of lateral acceleration, in the front wheel driving force, the rear wheel driving force on the turning locus outer side, and the front wheel braking force on the turning locus inner side when a vehicle to which a travel control apparatus according to a third embodiment of the present disclosure is applied is turning and the magnitude of lateral acceleration increases.

In the case where the magnitude |Gy| of lateral acceleration is increasing, as shown in FIG. 14A, the third apparatus computes the target driving torque Tdtrout of the rear wheel on the turning locus outer side using the table MapTdtrout (|St, Vb) of FIG. 6 after the driving force DYC execution permission condition is satisfied. When the magnitude |Gy| of lateral acceleration becomes equal to or larger than Gy1, the third apparatus generates at the rear wheel on the turning locus outer side the computed target driving torque Tdtrout (target driving force Fdtrout) of the rear wheel on the turning locus outer side.

After that, the third apparatus increases the rear wheel driving force Fdrout on the turning locus outer side with an increase in the magnitude |Gy| of lateral acceleration. Further, when the magnitude |Gy| of lateral acceleration becomes equal to or larger than the predetermined lateral acceleration threshold Gyth, the third apparatus sets the coupling torque of the clutch corresponding to the rear wheel on the turning locus outer side to zero. As a result, the driving force of the rear wheel on the turning locus outer side can be decreased immediately.

Further, when the magnitude |Gy| of lateral acceleration becomes equal to or larger than the predetermined lateral acceleration threshold Gyth, the third apparatus computes the front wheel target braking force Fbtfin on the turning locus inner side using the table MapFbtfin(|Gy|, Vb) of FIG. 10. The third apparatus controls the braking pressure of the corresponding wheel cylinder 44 such that the front wheel braking force Fbfin on the turning locus inner side coincides with the computed target braking force Fbtfin.

Figure 14B:
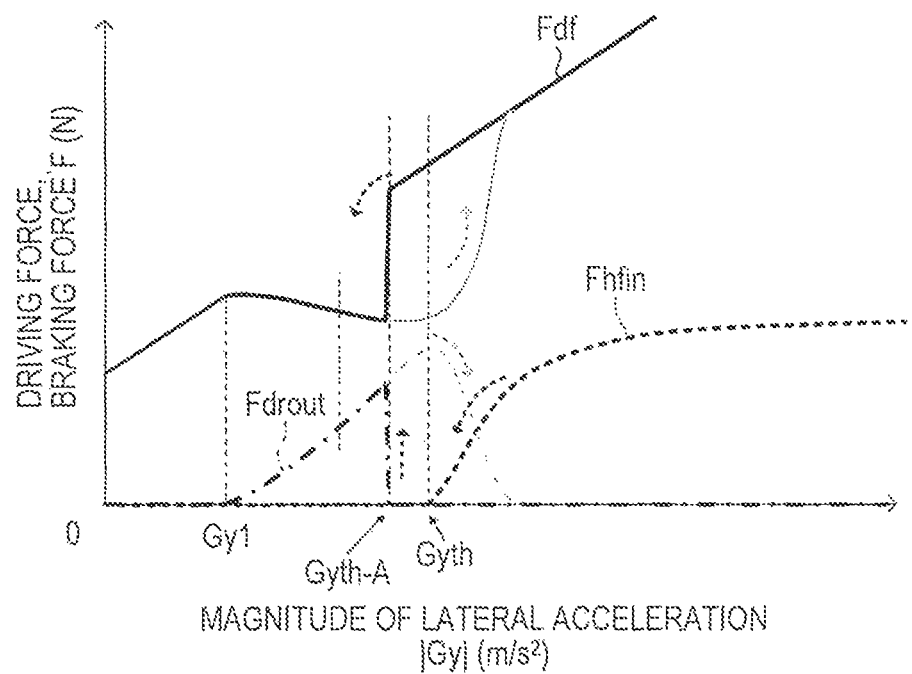
FIG. 14B is a diagram for illustrating changes, with the magnitude of lateral acceleration, in the front wheel driving force, the rear wheel driving force on the turning locus outer side, and the front wheel braking force on the turning locus inner side when a vehicle to which a travel control apparatus according to a third embodiment of the present disclosure is applied is turning and the magnitude of lateral acceleration decreases.

In the case where the magnitude |Gy| of lateral acceleration is decreasing, as shown in FIG. 14B, the third apparatus controls the braking pressure of the corresponding wheel cylinder 44FL or 44FR such that the front wheel braking force Fbfin on the turning locus inner side coincides with the computed target braking force Fbtfin. As a result, when the magnitude |Gy| of lateral acceleration reaches the predetermined lateral acceleration threshold Gyth, the front wheel braking force Fbfin on the turning locus inner side becomes zero. Further, when the magnitude |Gy| of lateral acceleration becomes equal to or smaller than the hysteresis threshold (Gyth−A), the third apparatus increases the rear wheel driving force Fdrout on the turning locus outer side to the target driving force Fdtrout. Accordingly, in the case where the magnitude |Gy| of lateral acceleration is decreasing, the third apparatus generates none of the front wheel braking force Fbfin on the turning locus inner side and the rear wheel driving force Fdrout on the turning locus outer side until the magnitude |Gy| of lateral acceleration changes from the predetermined lateral acceleration threshold Gyth to the hysteresis threshold (Gyth−A).

(Specific Operation)
<Coupling Control>

Figure 5:
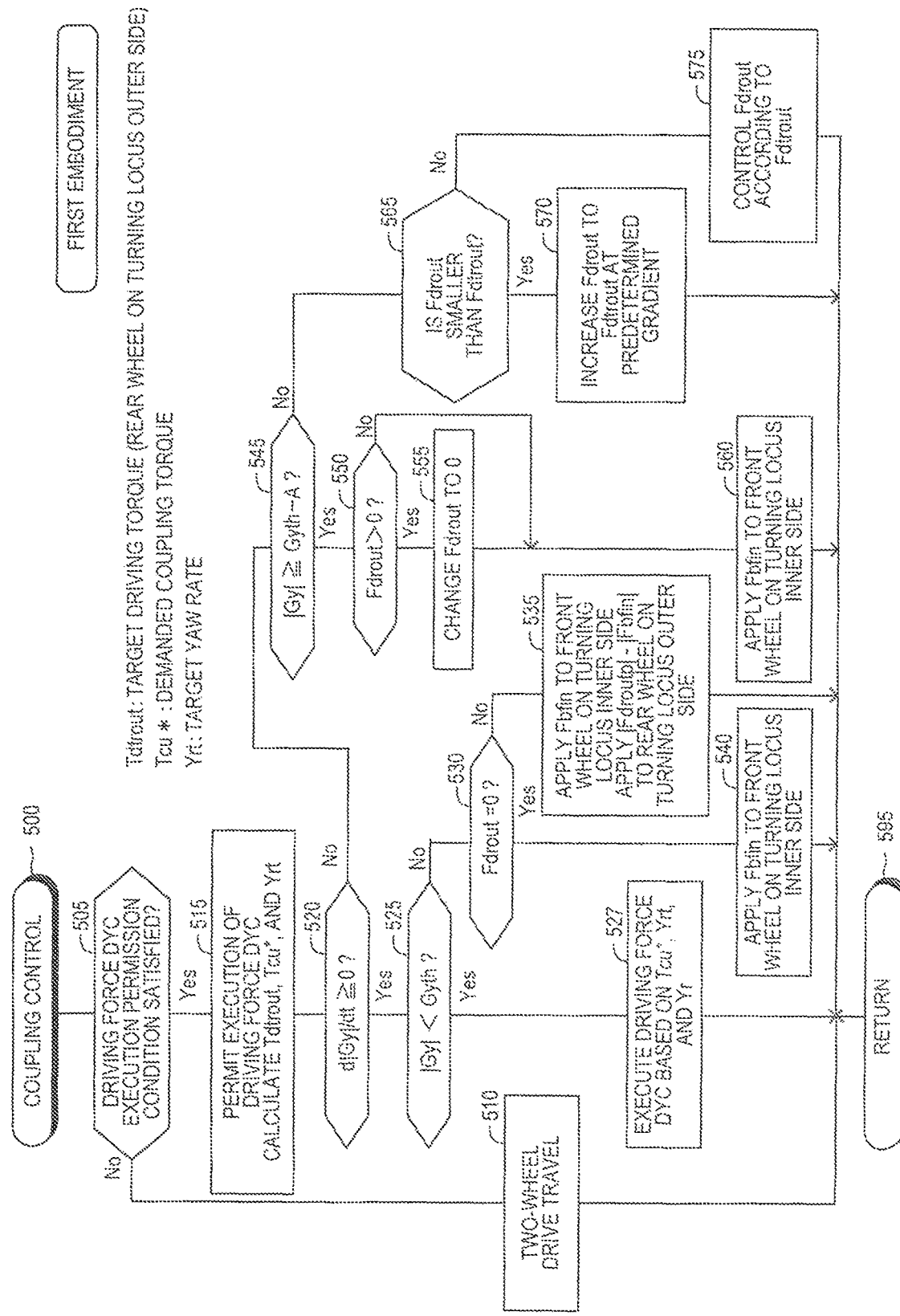
FIG. 5 is a flowchart for illustrating "coupling control routine" executed by the CPU of a 4WD ECU illustrated in FIG. 1.

Actual operation of the third apparatus will now be described. The CPU of a 4WD ECU 60B of the third apparatus executes a "coupling control routine" illustrated by a flowchart in FIG. 15 every time a constant time elapses. Notably, in FIG. 15, steps identical with those shown in FIG. 5 are denoted by the same step numbers. In the below, the operation will be described for each of different cases.

(1) Case where the Driving Force DYC Execution Permission Condition is not Satisfied The CPU starts the routine from Step 1500 at a predetermined timing and proceeds to Step 505. Under the above-mentioned assumption, the driving force DYC execution permission condition is not satisfied. Accordingly, the CPU makes a "No" determination at Step 505 and proceeds to Step 510 so as to execute processing for two-wheel drive travel (namely, front-wheel drive travel). Subsequently, the CPU proceeds directly to Step 1595 so as to tentatively terminate the present routine. Accordingly, in this case, the vehicle 10 is not turning, and the driving force DYC is not executed.

(2) Case where the Driving Force DYC Execution Permission Condition is Satisfied and the Magnitude of Lateral Acceleration of the Vehicle is Increasing Under the above-mentioned assumption, the driving force DYC execution permission condition is satisfied. Accordingly, the CPU makes a "Yes" determination at Step 505 and proceeds to Step 515 so as to permit three-wheel drive travel. Namely, execution of the driving force DYC is permitted, and the above-mentioned processing at Step 515 (computation of the target driving torque Tdtrout, the demanded coupling torque Tcu*, and the target yaw rate Yrt) is performed.

Subsequently, the CPU proceeds to Step 520. Under the above-mentioned assumption, the magnitude |Gy| of lateral acceleration is increasing. Accordingly, the CPU makes a "Yes" determination at Step 520 and proceeds to Step 525. In the case where the magnitude |Gy| of lateral acceleration is smaller than the predetermined lateral acceleration threshold Gyth, the CPU makes a "Yes" determination at Step 525 and proceeds to Step 527 so as to execute the driving force DYC by performing the above-mentioned processing of Step 527.

As a result, a "driving force Fdrout corresponding to the target driving torque Tdtrout" is generated at the rear wheel on the turning locus outer side. Subsequently, the CPU proceeds to Step 1595 and tentatively terminates the present routine. Namely, in this case, the three-wheel drive travel is performed.

Meanwhile, in the case where the magnitude |Gy| of lateral acceleration is equal to or larger than the predetermined lateral acceleration threshold Gyth, the CPU makes a "No" determination at Step 525 and proceeds to Step 1510 so as to change the rear wheel driving force Fdrout on the turning locus outer side to zero. Namely, at Step 1510, the CPU changes the travel state of the vehicle 10 from the "three-wheel drive travel" state to the "two-wheel drive travel" state. Subsequently, the CPU proceeds to Step 540 and computes the front wheel target braking force Fbtfin on the turning locus inner side using the table MapFbtfin(|Gy|, Vb) of FIG. 10. The CPU controls the braking pressure of the corresponding wheel cylinder such that the front wheel braking force Fbfin coincides with the computed front wheel target braking force Fbtfin. Subsequently, the CPU proceeds to Step 1595 and tentatively terminates the present routine.

(3) Case where the Driving Force DYC Execution Permission Condition is Satisfied and the Magnitude of Lateral Acceleration of the Vehicle is Decreasing Under the above-mentioned assumption, the driving force DYC execution permission condition is satisfied, and the magnitude |Gy| of lateral acceleration is decreasing. Accordingly, the CPU makes a "Yes" determination at Step 505, and proceeds to Step 515 to permit the three-wheel drive travel. Subsequently, the CPU makes a "No" determination at Step 520 and proceeds to Step 545.

In the case where the magnitude |Gy| of lateral acceleration is equal to or larger than the hysteresis threshold (Gyth−A), the CPU makes a "Yes" determination at Step 545 and proceeds to Step 550. In the case where the rear wheel driving force Fdrout on the turning locus outer side is larger than zero, the CPU makes a "Yes" determination at Step 550 and proceeds to Step 555. At Step 555, the CPU decreases the rear wheel driving force Fdrout on the turning locus outer side to zero. Subsequently, the CPU proceeds to Step 560 so as to compute the front wheel target braking force Fbtfin on the turning locus inner side using the table MapFbtfin(|Gy|, Vb) of FIG. 10. The CPU controls the braking pressure of the corresponding wheel cylinder such that the front wheel braking force Fbfin coincides with the computed front wheel target braking force Fbtfin.

Meanwhile, in the case where the magnitude |Gy| of lateral acceleration is smaller than the hysteresis threshold (Gyth−A), the CPU makes a "No" determination at Step 545 and proceeds to Step 575. At Step 575, the CPU controls the coupling torque Tcu of the clutch corresponding to the rear wheel on the turning locus outer side such that the rear wheel driving force Fdrout on the turning locus outer side coincides with the rear wheel target driving force Fdtrout on the turning locus outer side. Namely, in the case where the magnitude |Gy| of lateral acceleration is decreasing, the CPU does not generate the rear wheel driving force Fdrout on the turning locus outer side in the period between the point in time when the magnitude |Gy| of lateral acceleration has become equal to the predetermined lateral acceleration threshold Gyth and the point in time when the magnitude |Gy| of lateral acceleration becomes equal to the hysteresis threshold (Gyth−A).

Modifications

The present disclosure is not limited to the above-mentioned embodiments, and various modifications can be adopted within the scope of the present disclosure.

In the above-mentioned embodiments, the speed increasing ratio RZ is set to 1.02. However, the speed increasing ratio RZ may be set to an arbitrary value greater than 1.

Figure 13:
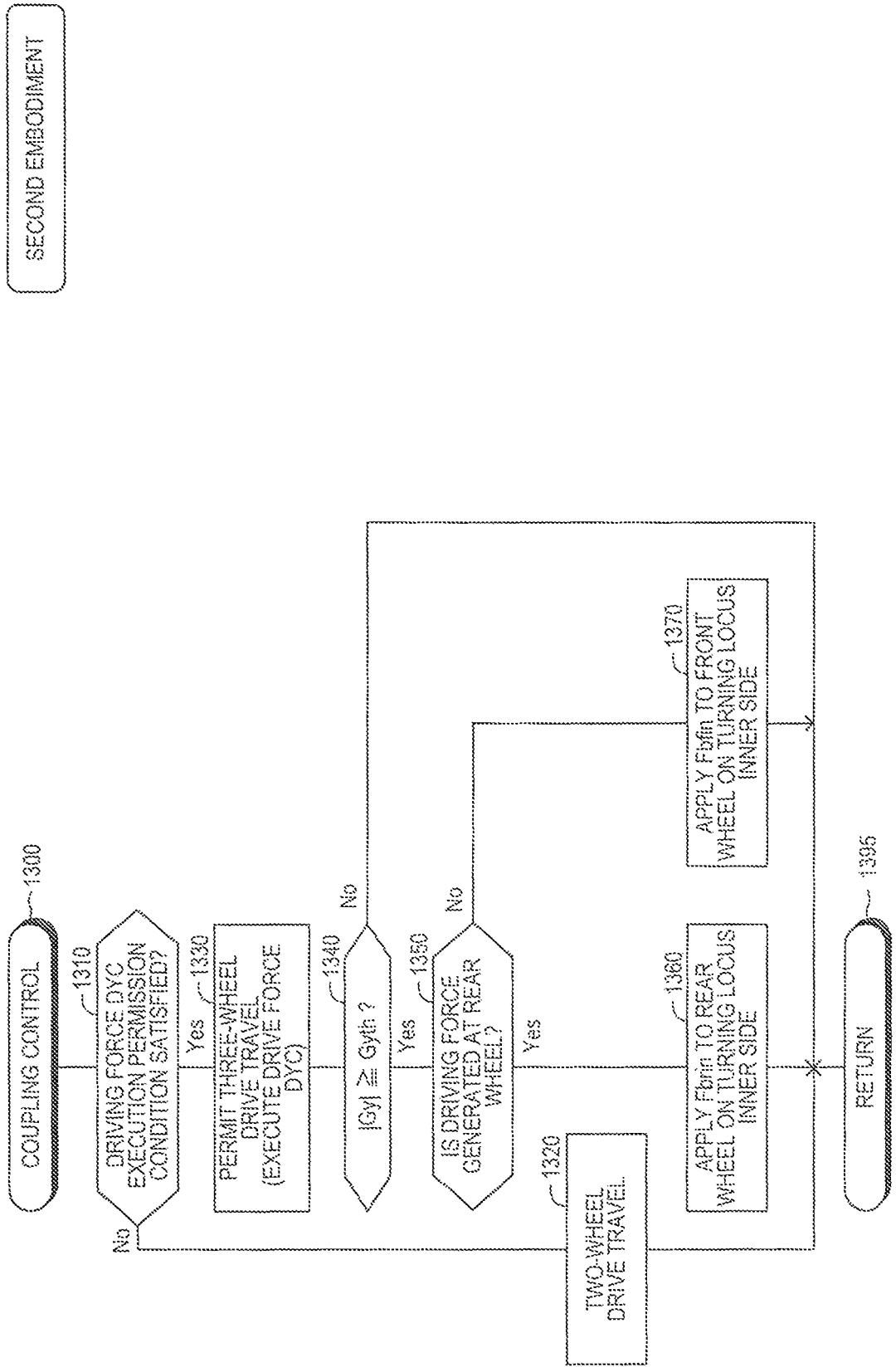
FIG. 13 is a flowchart for illustrating "coupling control routine" executed by the CPU of the 4WD ECU of the travel control apparatus according to the second embodiment of the present disclosure.
Figure 15:
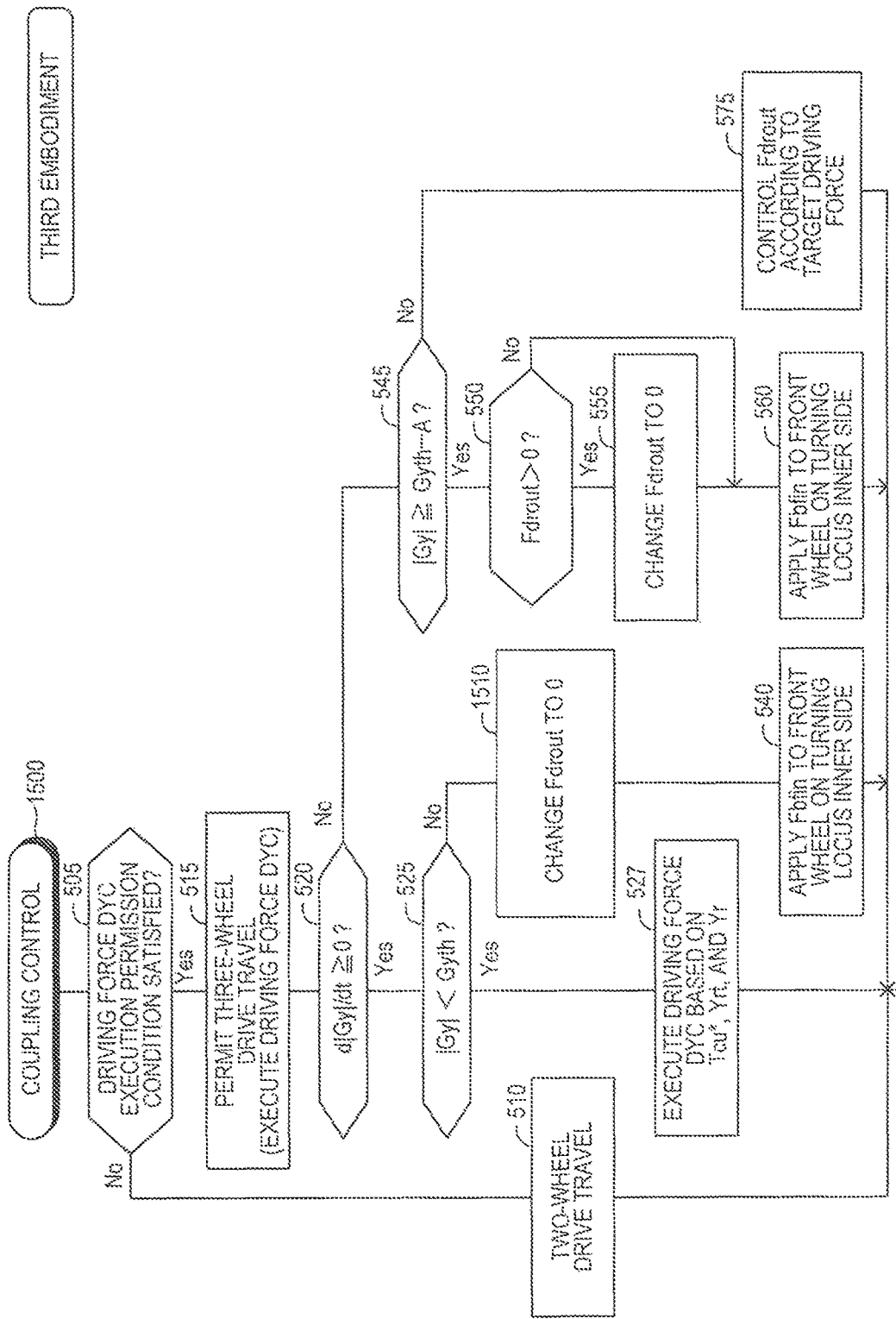
FIG. 15 is a flowchart for illustrating "coupling control routine" executed by the CPU of the 4WD ECU of the travel control apparatus according to the third embodiment of the present disclosure.

In the above-mentioned embodiments, the CPU of the 4WD ECU 60 (60A, 60B) executes the routine shown in FIG. 5, 13, or 15. However, the above-mentioned routine may be executed by the CPU of the brake ECU 70 in place of the CPU of the 4WD ECU 60, or may be executed by the CPU of a single ECU into which the 4WD ECU 60, the brake ECU 70, etc. are integrated.

In the above-mentioned embodiments, the clutch apparatus (coupling apparatus) 36 is a clutch apparatus in which a multi-disc clutch and an electromagnetic clutch are combined. However, only a multi-disc clutch or an electromagnetic clutch may be used. Also, a planetary gear may be used in the clutch apparatus.

In the above-mentioned embodiments, the yaw rate sensor 85, the lateral acceleration sensor 86, and the longitudinal acceleration sensor 87 are individually provided in the vehicle 10. However, the yaw rate sensor 85, the lateral acceleration sensor 86, the longitudinal acceleration sensor 87 may be replaced with a motion state quantity sensor into which these sensors are integrated.

In the above-mentioned embodiments, the first clutch 361 is provided between the rear differential case 353 and the rear left wheel axle 38L, and the second clutch 362 is provided between the rear differential case 353 and the rear right wheel axle 38R. Namely, in the above-mentioned embodiments, the vehicle 10 is configured such that the front wheels serve as the primary drive wheels, and the rear wheels serve as the secondary drive wheels. However, a travel control apparatus according to a modified embodiment may be applied to a vehicle in which clutches corresponding to the first clutch 361 and the second clutch 362 are provided for the front wheels. Namely, the travel control apparatus according to the modified embodiment may be applied to a vehicle configured such that the front wheels serve as the secondary drive wheels, and the rear wheels serve as the primary drive wheels.

According to the aspect, when the driving force DYC is performed, at the time of rightward turning, the coupling torque of the clutch corresponding to the front left wheel WFL is set to a value greater than zero, and the coupling torque of the clutch corresponding to the front right wheel WFR is set to zero. Meanwhile, at the time of leftward turning, the coupling torque of the clutch corresponding to the front right wheel WFR is set to a value greater than zero, and the coupling torque of the clutch corresponding to the front left wheel WFL 57; is set to zero. When the driving force DYC is not performed, both the coupling torque of the clutch corresponding to the front left wheel WFL and the coupling torque of the clutch corresponding to the front right wheel WFR are set to zero.

In the above-mentioned embodiments, the drive apparatus 20 is a combination of an internal combustion engine and a transmission apparatus. However, the drive apparatus 20 may be a combination of an electric motor and a transmission apparatus, or a drive apparatus for a hybrid system in which an internal combustion engine, an electric motor, and a transmission apparatus are combined.

What is claimed is:

1. A travel control apparatus applicable to a four-wheel drive vehicle which includes:
   a drive apparatus configured to be capable of generating driving force;
   a differential apparatus configured to transmit the driving force to a left primary drive wheel axle connected to a left primary drive wheel and a right primary drive wheel axle connected to a right primary drive wheel while allowing a differential between the left primary drive wheel axle and the right primary drive wheel axle;

a transfer gear apparatus configured to transmit the driving force to a secondary drive wheel side;

a final gear apparatus configured to be capable of transmitting the driving force from the transfer gear apparatus to a left secondary drive wheel axle connected to a left secondary drive wheel and a right secondary drive wheel axle connected to a right secondary drive wheel;

a first coupling apparatus interposed between a drive output part of the final gear apparatus and the left secondary drive wheel axle and configured to be capable of changing coupling torque between the drive output part and the left secondary drive wheel axle;

a second coupling apparatus interposed between the drive output part and the right secondary drive wheel axle and configured to be capable of changing coupling torque between the drive output part and the right secondary drive wheel axle; and a brake apparatus configured to be capable of individually changing braking forces applied to the left primary drive wheel, the right primary drive wheel, the left secondary drive wheels, and the right secondary drive wheel, respectively, a ratio of rotational speed of the drive output part to an average of rotational speed of the left primary drive wheel axle and rotational speed of the right primary drive wheel axle being set to a predetermined ratio greater than 1, the travel control apparatus comprising a controller configured to be capable of controlling the coupling torque of the first coupling apparatus and the coupling torque of the second coupling apparatus independently of each other and to be capable of individually controlling the braking forces of the wheels by using the brake apparatus, wherein the controller is configured such that, when the four-wheel drive vehicle is turning, in order to increase a yaw moment of the four-wheel drive vehicle in a turning direction, the controller executes driving force yaw moment control of setting the coupling torque of one of the first coupling apparatus and the second coupling apparatus which corresponds to the secondary drive wheel on a turning locus outer side to a value greater than zero and setting the coupling torque of the other coupling apparatus to zero, and when a demand of further increasing the yaw moment in the turning direction arises during execution of the driving force yaw moment control, the controller executes one of first and second controls, the first control rendering the braking force of the primary drive wheel on a turning locus inner side coincident with a first target braking force changing with a travel state of the four-wheel drive vehicle and decreasing the coupling torque of one of the first coupling apparatus and the second coupling apparatus which corresponds to the secondary drive wheel on the turning locus outer side, and the second control rendering the braking force of the secondary drive wheel on the turning locus inner side coincident with a second target braking force changing with the travel state of the four-wheel drive vehicle.

2. A travel control apparatus according to claim 1, wherein the controller is configured to execute the first control, and the controller is configured to execute, as the first control, control of rendering the driving force of the secondary drive wheel on the turning locus outer side coincident with a value obtained by subtracting the magnitude of the first target braking force from the magnitude of the driving force of the secondary drive wheel on the turning locus outer side at the time of arising of the demand of further increasing the yaw moment in the turning direction.

3. A travel control apparatus according to claim 1, wherein the controller is configured such that, in the case where, during execution of the first control, the magnitude of lateral acceleration of the four-wheel drive vehicle changes from a first magnitude to a second magnitude, the first magnitude being equal to or larger than a determination value which is smaller by a predetermined value than the magnitude of lateral acceleration at the time of arising of the demand of further increasing the yaw moment in the turning direction and the second magnitude being smaller than the determination value, the controller increases the coupling torque of one of the first coupling apparatus and the second coupling apparatus which corresponds to the secondary drive wheel on the turning locus outer side such that the driving force of the secondary drive wheel on the turning locus outer side coincides with a target driving force determined based on the travel state of the four-wheel drive vehicle.

4. A travel control apparatus according to claim 2, wherein the controller is configured such that, in the case where, during execution of the first control, the magnitude of lateral acceleration of the four-wheel drive vehicle changes from a first magnitude to a second magnitude, the first magnitude being equal to or larger than a determination value which is smaller by a predetermined value than the magnitude of lateral acceleration at the time of arising of the demand of further increasing the yaw moment in the turning direction and the second magnitude being smaller than the determination value, the controller Increases the coupling torque of one of the first coupling apparatus and the second coupling apparatus which corresponds to the secondary drive wheel on the turning locus outer side such that the driving force of the secondary drive wheel on the turning locus outer side coincides with a target driving force determined based on the travel state of the four-wheel drive vehicle.

5. A travel control apparatus according to claim 2, wherein the controller is configured to decrease the coupling torque of the one of the first coupling apparatus and the second coupling apparatus which corresponds to the secondary drive wheel on the turning locus outer side when the direction of change of the magnitude of the lateral acceleration changes from an increasing direction to a decreasing direction.

6. A travel control apparatus according to claim 4, wherein the controller is configured to decrease the coupling torque of the one of the first coupling apparatus and the second coupling apparatus which corresponds to the secondary drive wheel on the turning locus outer side when the direction of change of the magnitude of the lateral acceleration changes from an increasing direction to a decreasing direction.

* * * * *